(12) United States Patent
Orsley

(10) Patent No.: US 7,076,606 B2
(45) Date of Patent: Jul. 11, 2006

(54) ACCELERATED RAID WITH REWIND CAPABILITY

(75) Inventor: Tim Orsley, San Jose, CA (US)

(73) Assignee: Quantum Corporation, San Jose, CA (US)

( * ) Notice: Subject to any disclaimer, the term of this patent is extended or adjusted under 35 U.S.C. 154(b) by 203 days.

(21) Appl. No.: 10/247,859

(22) Filed: Sep. 20, 2002

(65) Prior Publication Data

US 2004/0059869 A1   Mar. 25, 2004

(51) Int. Cl.
*G06F 12/00* (2006.01)

(52) U.S. Cl. .......................... 711/114; 711/162; 714/6; 707/204

(58) Field of Classification Search ................ 711/165, 711/111–114, 133–136, 144–145, 159–162; 707/204; 714/1–7
See application file for complete search history.

(56) References Cited

U.S. PATENT DOCUMENTS

| 5,297,258 | A | * | 3/1994 | Hale et al. ................... | 711/114 |
| 5,392,244 | A | * | 2/1995 | Jacobson et al. ............ | 711/114 |
| 5,504,883 | A | * | 4/1996 | Coverston et al. .......... | 707/202 |
| 5,649,152 | A | * | 7/1997 | Ohran et al. ................. | 711/114 |
| 5,835,953 | A | * | 11/1998 | Ohran ......................... | 711/162 |
| 5,960,451 | A | * | 9/1999 | Voigt et al. .................. | 711/114 |
| 6,073,222 | A | * | 6/2000 | Ohran ......................... | 711/162 |
| 6,085,298 | A | * | 7/2000 | Ohran ......................... | 711/162 |
| 6,098,128 | A | * | 8/2000 | Velez-McCaskey et al. .. | 710/65 |
| 6,148,368 | A | * | 11/2000 | DeKoning ................... | 711/113 |
| 6,247,149 | B1 | * | 6/2001 | Falls et al. .................... | 714/45 |
| 6,567,889 | B1 | * | 5/2003 | DeKoning et al. .......... | 711/114 |
| 6,674,447 | B1 | * | 1/2004 | Chiang et al. .............. | 345/704 |
| 6,704,838 | B1 | * | 3/2004 | Anderson ................... | 711/114 |
| 6,718,434 | B1 | * | 4/2004 | Veitch et al. ............... | 711/114 |
| 2002/0156971 | A1 | * | 10/2002 | Jones et al. ................. | 711/114 |

OTHER PUBLICATIONS

Using two-level stable storage for efficient checkpoint☐☐Silva, L.M.; Silva, J.G.; Software, IEE Proceedings- [see also Software Engineering, IEE Proceedings], vol.: 145, Issue: 6 , Dec. 1998; pp.: 198-202.*

Effective and concurrent checkpointing and recovery in distributed systems☐☐Hou, C.J.; Tsoi, K.S.; Han, C.C.; Computers and Digital Techniques, IEE Proceedings- , vol.: 144 , Issue: 5 , Sep. 1997 ☐☐pp.: 304-316.*

Adaptive independent checkpointing for reducing rollback propagation☐☐Xu, J.; Netzer, R.H.D.; Parallel and Distributed Processing, 1993. Proceedings of the Fifth IEEE Symposium on , Dec. 1-4, 1993 ☐☐pp.: 754-761.*

* cited by examiner

*Primary Examiner*—Nasser Moazzami
(74) *Attorney, Agent, or Firm*—Michael Zarrabian

(57) ABSTRACT

A method for storing data in a fault-tolerant storage subsystem having an array of failure independent data storage units, by dividing the storage area on the storage units into a logical mirror area and a logical stripe area, such that when storing data in the mirror area, duplicating the data by keeping a duplicate copy of the data on a pair of storage units, and when storing data in the stripe area, storing data as stripes of blocks, including data blocks and associated error-correction blocks.

17 Claims, 18 Drawing Sheets

ACCELERATED RAID WITH REWIND CAPABILITY

FIELD OF THE INVENTION

The present invention relates to data protection in data storage devices, and in particular to data protection in disk arrays.

BACKGROUND OF THE INVENTION

Storage devices of various types are utilized for storing information such as in computer systems. Conventional computer systems include storage devices such as disk drives for storing information managed by an operating system file system. With decreasing costs of storage space, an increasing amount of data is stored on individual disk drives. However, in case of disk drive failure, important data can be lost. To alleviate this problem, some fault-tolerant storage devices utilize an array of redundant disk drives (RAID).

In typical data storage systems including storage devices such as primary disk drives, the data stored on the primary storage devices is backed-up to secondary storage devices such as tape, from time to time. However, any change to the data on the primary storage devices before the next back-up, can be lost if one or more of the primary storage devices fail.

True data protection can be achieved by keeping a log of all writes to a storage device, on a data block level. In one example, a user data set and a write log are maintained, wherein the data set has been completely backed up and thereafter a log of all writes is maintained. The backed-up data set and the write log allows returning to the state of the data set before the current state of the data set, by restoring the backed-up (baseline) data set and then executing all writes from that log up until that time.

To protect the log file itself, RAID configured disk arrays provide protection against data loss by protecting a single disk drive failure. Protecting the log file stream using RAID has been achieved by either a RAID mirror (known as RAID-1) shown by example in FIG. 1, or a RAID stripe (known as RAID-5) shown by example in FIG. 2. In the RAID mirror 10 including several disk drives 12, two disk drives store the data of one independent disk drive. In the RAID stripe 14, n+1 disk drives 12 are required to store the data of n independent disk drives (e.g., in FIG. 2, a stripe of five disk drives stores the data of four independent disk drives). The example RAID mirror 10 in FIG. 1 includes an array of eight disk drives 12 (e.g., drive0–drive7), wherein each disk drive 12 has e.g. 100 GB capacity. In each disk drive 12, half the capacity is used for user data, and another half for mirror data. As such, user data capacity of the disk array 10 is 400 GB and the other 400 GB is used for mirror data. In this example mirror configuration, drive1 protects drive0 data (M0), drive2 protects drive1 data (M1), etc. If drive0 fails, then the data M0 in drive1 can be used to recreate data M0 in drive0, and the data M7 in drive7 can be used to crate data M7 of drive0. As such, no data is lost in case of a single disk drive failure.

Referring back to FIG. 2, a RAID stripe configuration effectively groups capacity from all but one of the disk drives in the disk array 14 and writes the parity (XOR) of that capacity on the remaining disk drive (or across multiple drives as shown). In the example FIG. 2, the disk array 14 includes five disk drives 12 (e.g., drive0–drive4) each disk drive 12 having e.g. 100 GB capacity, divided into 5 sections. The blocks S0–S3 in the top portions of drive0–drive3 are for user data, and a block of drive4 is for parity data (i.e., XOR of S0–S3). In this example, the RAID stripe capacity is 400 GB for user data and 100 GB for parity data. The parity area is distributed among the disk drives 12 as shown. Spreading the parity data across the disk drives 12 allows spreading the task of reading the parity data over several disk drives as opposed to just one disk drive. Writing on a disk drive in a stripe configuration requires that the disk drive holding parity be read, a new parity calculated and the new parity written over the old parity. This requires a disk revolution and increases the write latency. The increased write latency decreases the throughput of the storage device 14.

On the other hand, the RAID mirror configuration ("mirror") allows writing the log file stream to disk faster than the RAID stripe configuration ("stripe"). A mirror is faster than a stripe since in the mirror, each write activity is independent of other write activities, in that the same block can be written to the mirroring disk drives at the same time. However, a mirror configuration requires that the capacity to be protected be matched on another disk drive. This is costly as the capacity to be protected must be duplicated, requiring double the number of disk drives. A stripe reduces such capacity to 1/n where n is the number of disk drives in the disk drive array. As such, protecting data with parity across multiple disk drives makes a stripe slower than a mirror, but more cost effective.

There is, therefore, a need for a method and system of providing cost effective data protection with improved data read/write performance than a conventional RAID system. There is also a need for such a system to provide the capability of returning to a desired previous data state.

BRIEF SUMMARY OF THE INVENTION

The present invention satisfies these needs. In one embodiment, the present invention provides a method for storing data in a fault-tolerant storage subsystem having an array of failure independent data storage units, by dividing the storage area on the storage units into a hybrid of a logical mirror area (i.e., RAID mirror) and a logical stripe area (i.e., RAID stripe). When storing data in the mirror area, the data is duplicated by keeping a duplicate copy of the data on a pair of storage units, and when storing data in the stripe area, the data is stored as stripes of blocks, including data blocks and associated error-correction blocks.

In one version of the present invention, a log file stream is maintained as a log cache in the RAID mirror area for writing data from a host to the storage subsystem, and then data is transferred from the log file in the RAID mirror area to the final address in the RAID stripe area, preferably as a background task. In doing so, the aforementioned write latency performance penalty associated with writes to a RAID stripe can be masked from the host.

To further enhance performance, according to the present invention, a memory cache (RAM cache) is added in front of the log cache, wherein incoming host blocks are first written to RAM cache quickly and the host is acknowledged. The host perceives a faster write cycle than is possible if the data were written to a data storage unit while the host waited for an acknowledgement. This further enhances the performance of the above hybrid RAID subsystem.

While the data is en-route to a data storage unit through the RAM cache, power failure can result in data loss. As such, according to another aspect of the present invention, a flashback module (backup module) is added to the subsystem to protect the RAM cache data. The flashback module includes a non-volatile memory, such as flash memory, and a battery. During normal operations, the battery is trickle charged. Should any power failure then occur, the battery provides power to transfer the contents of the RAM cache to the flash memory. Upon restoration of power, the flash memory contents are transferred back to the RAM cache, and normal operations resume.

Read performance is further enhanced by pressing a data storage unit (e.g., disk drive) normally used as a spare data storage unit ("hot spare") in the array, into temporary service in the hybrid RAID system. In a conventional RAID subsystem, any hot spare lies dormant but ready to take over if one of the data storage units in the array should fail. According to the present invention, rather than lying dormant, the hot spare can be used to replicate the data in the mirrored area of the hybrid RAID subsystem. Should any data storage unit in the array fail, this hot spare could immediately be delivered to take the place of that failed data storage unit without increasing exposure to data loss from a single data storage unit failure. However, while all the data storage units of the array are working properly, the replication of the mirror area would make the array more responsive to read requests by allowing the hot spare to supplement the mirror area.

The mirror area acts as a temporary store for the log, prior to storing the write data in its final location in the stripe area. In another version of the present invention, prior to purging the data from the mirror area, the log can be written sequentially to an archival storage medium such as tape. If a baseline backup of the entire RAID subsystem stripe is created just before the log files are archived, each successive state of the RAID subsystem can be recreated by re-executing the write requests within the archived log files. This would allow any earlier state of the stripe of the RAID subsystem to be recreated (i.e., infinite roll-back or rewind). This is beneficial in allowing recovery from e.g. user error such as accidentally erasing a file, from a virus infection, etc.

As such, the present invention provides a method and system of providing cost effective data protection with improved data read/write performance than a conventional RAID system, and also provides the capability of returning to a desired previous data state.

BRIEF DESCRIPTION OF THE DRAWINGS

These and other features, aspects and advantages of the present invention will become understood with reference to the following description, appended claims and accompanying figures where:

DETAILED DESCRIPTION OF THE INVENTION

Figure 3A:
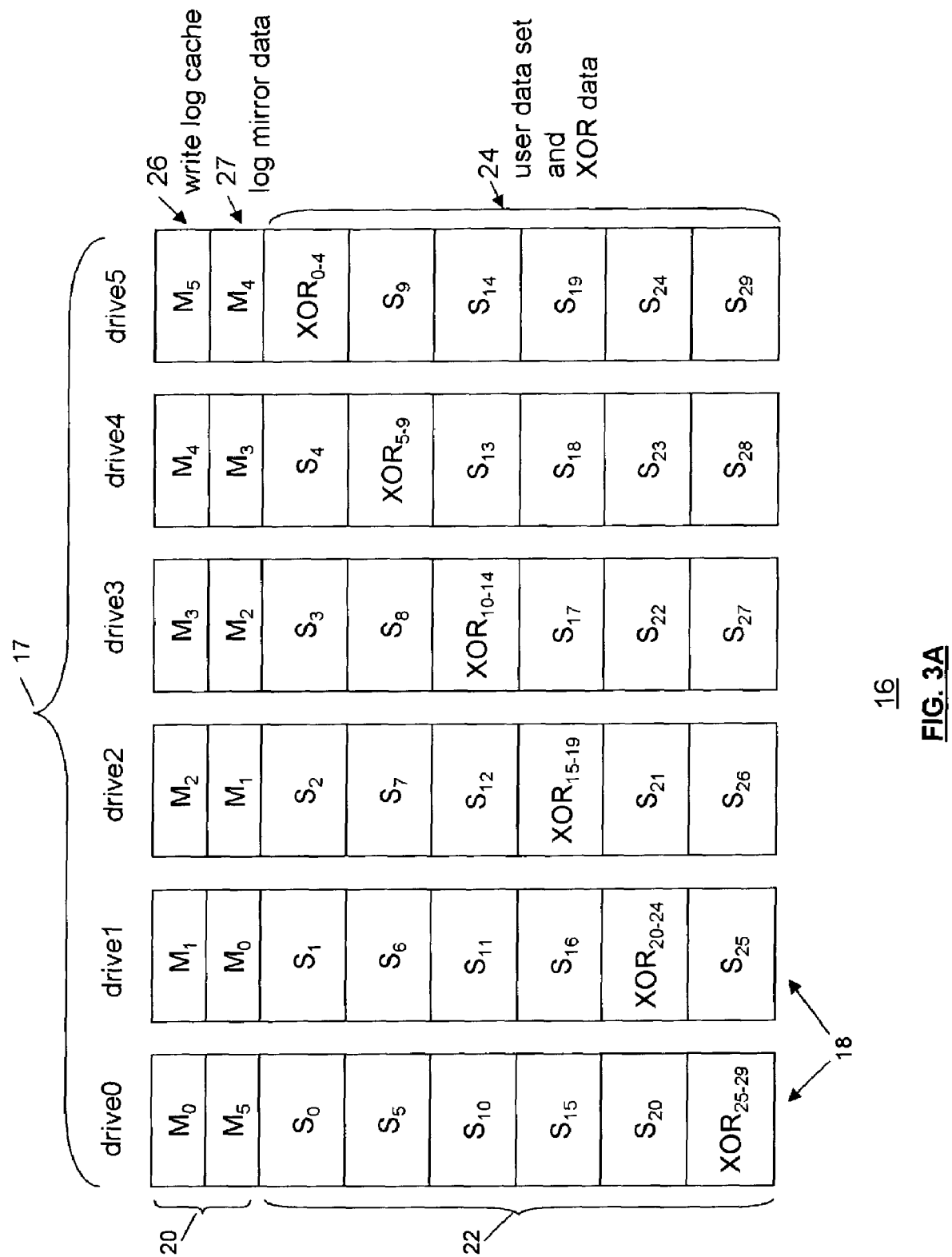
FIG. 3A shows a block diagram of an example hybrid RAID data organization in a disk array according to an embodiment of the present invention.

Referring to FIG. 3A, an example fault-tolerant storage subsystem 16 having an array of failure independent data storage units 18, such as disk drives, using a hybrid RAID data organization according to an embodiment of the present invention is shown. The data storage units 18 can be other storage devices, such as e.g. optical storage devices, DVD-RAM, etc. As discussed, protecting data with parity across multiple disk drives makes a RAID stripe slow but cost effective. A RAID mirror provides better data transfer performance because the target sector is simultaneously written on two disk drives, but requires that the capacity to be protected be matched on another disk drive. Whereas a RAID stripe reduces such capacity to 1/n where n is the number of drives in the disk array, but in a RAID stripe, both the target and the parity sector must be read then written, causing write latency.

In the example of FIG. 3A, an array 17 of six disk drives 18 (e.g., drive0–drive5) is utilized for storing data from, and reading data back to, a host system, and is configured to include both a RAID mirror data organization and a RAID stripe data organization according to the present invention. In the disk array 17, the RAID mirror ("mirror") configuration provides performance advantage when transferring data to disk drives 18 using e.g. a log file stream approach, and the RAID stripe ("stripe") configuration provides cost effectiveness by using the stripe organization for general purpose storage of user data sets.

Figure 3B:
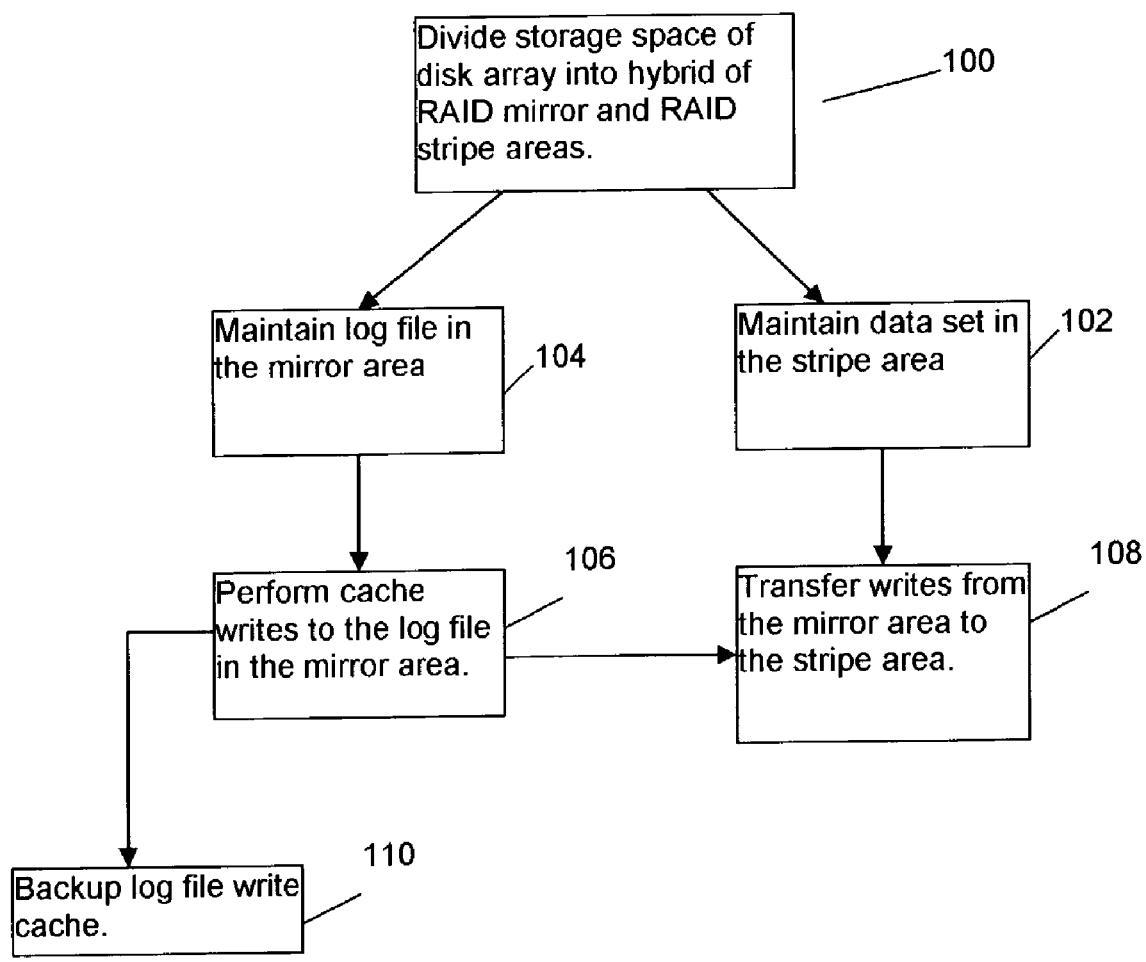
FIG. 3B shows an example flowchart of an embodiment of the steps of data storage according to the present invention.

Referring to the example steps in the flowchart of FIG. 3B, according to an embodiment of the present invention, this is achieved by dividing the capacity of the disk array 17 of FIG. 3A into at least two areas (segments), including a mirror area 20 and a stripe area 22 (step 100). A data set 24 is maintained in the stripe area 22 (step 102), and an associated log file/stream 26 is maintained in the mirror area 20 (step 104). The log file 26 is maintained as a write log cache in the mirror area 20, such that upon receiving a write request from a host, the host data is written to the log file 26 (step 106), and then data is transferred from the log file 26 in the mirror area 20 to a final address in the data set 24 in the stripe area 22 (preferably, performed as a background task) (step 108). In doing so, the aforementioned write latency performance penalty associated with writes to a RAID stripe can be masked from the host. Preferably, the log is backed-up to tape continually or on a regular basis (step 110). The above steps are repeated as write requests arrive from the host. The disk array 17 can include additional hybrid RAID mirror and RAID stripe configured areas according to the present invention.

Figure 1:
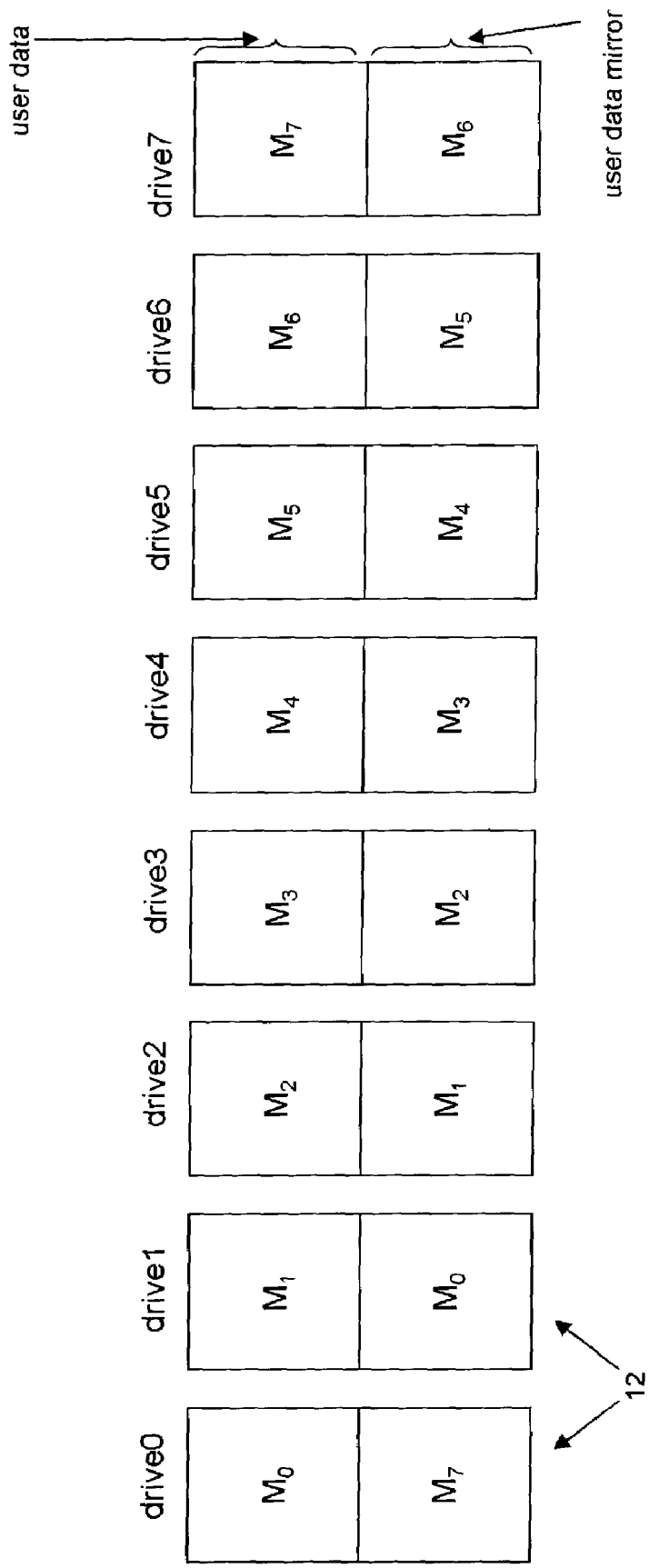
FIG. 1 shows a block diagram of an example disk array configured as a RAID mirror.
Figure 2:
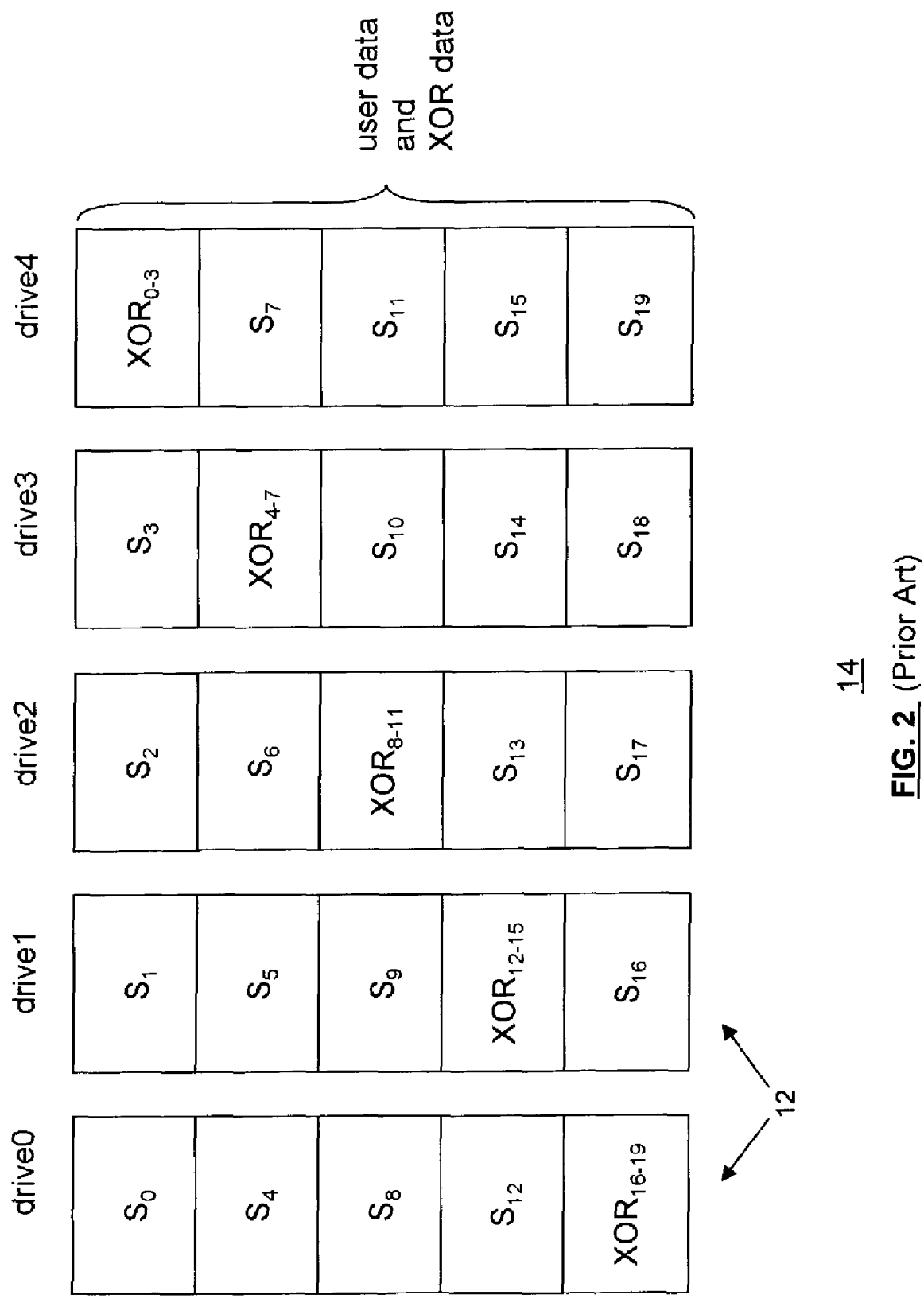
FIG. 2 shows a block diagram of an example disk array configured as a RAID stripe.
Figure 3C:
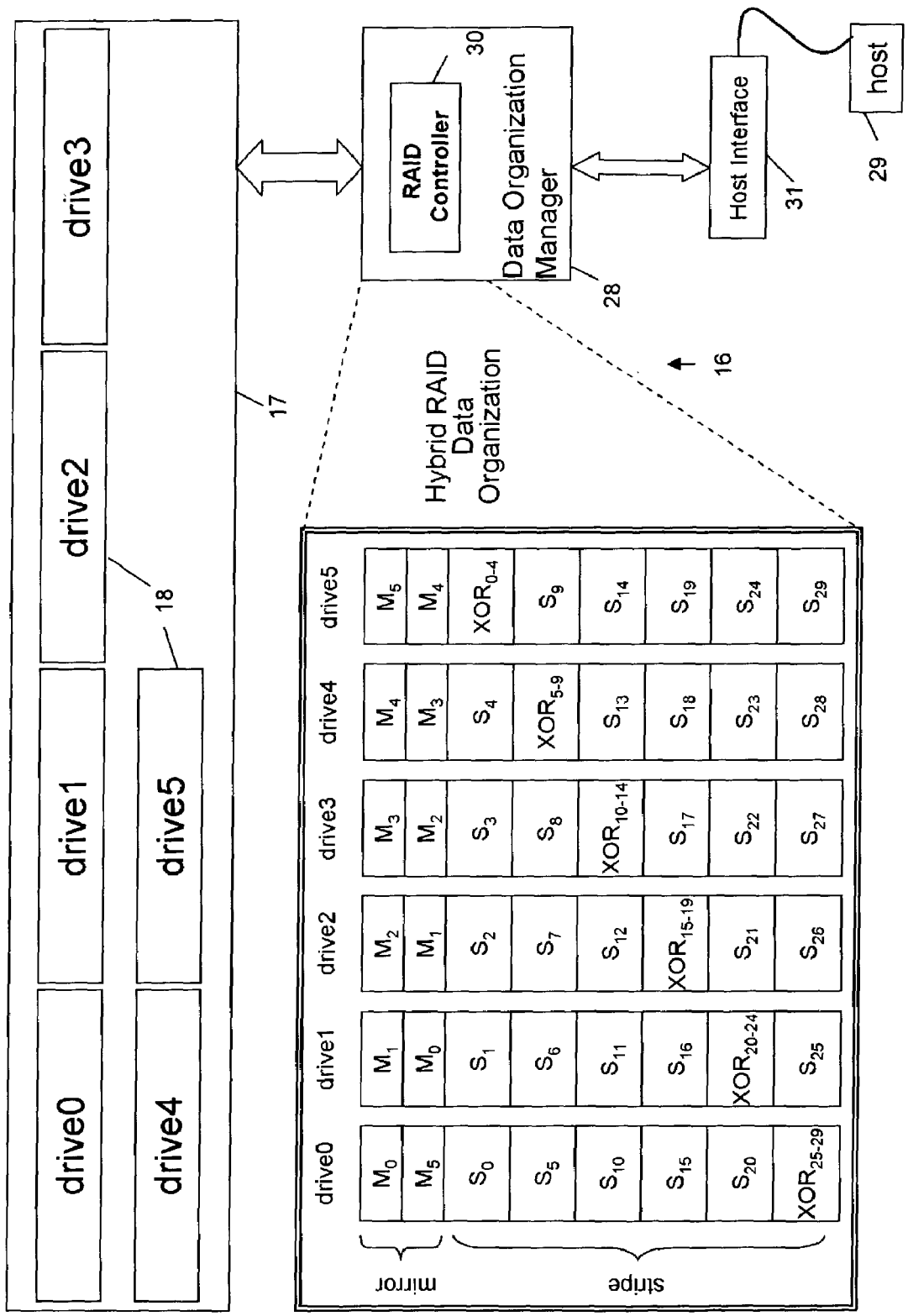
FIG. 3C shows a block diagram of an example RAID subsystem logically configured as hybrid RAID stripe and mirror, according to the hybrid RAID data organization FIG. 3A.

Referring to FIG. 3C, the example hybrid RAID subsystem 16 according to the present invention further includes a data organization manager 28 having a RAID controller 30 that implements the hybrid data organization of FIG. 3A on the disk array 17 (e.g., an array of N disk drives 18). In the example of FIG. 3C, an array 17 of N=6 disk drives (drive0–drive5, e.g. 100 GB each) is configured such that portions of the capacity of the disk drives 18 are used as a RAID mirror for the write log cache 26 and write log cache mirror data 27 (i.e., M0–M5). And, remaining portions of the capacity of the disk drives 18 are used a RAID stripe for user data (e.g., S0–S29) and parity data (e.g., XOR0–XOR29). In this example, 400 GB of user data is stored in the hybrid RAID subsystem 16, compared to the same capacity in the RAID mirror 10 of FIG. 1 and the RAID stripe 14 of FIG. 2. The subsystem 16 communicates with a host 29 via a host interface 31. Other numbers of disk drives and with different storage capacities can also be used in the RAID subsystem 16 of FIG. 3C, according to the present invention.

Figure 4A:
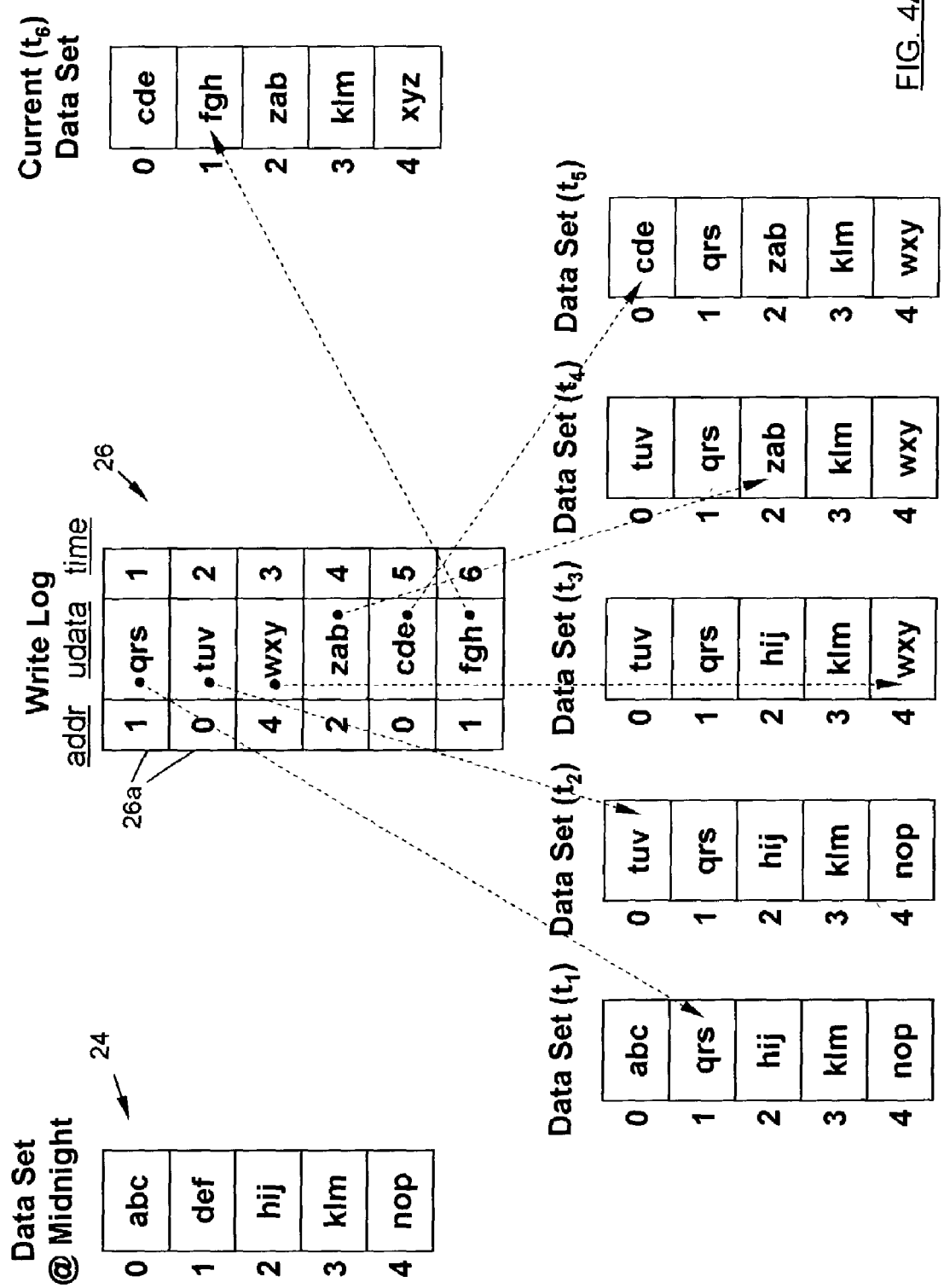
FIG. 4A shows an example data set and a log of updates to the data set after a back-up.

FIG. 4A shows an example user data set 24 and a write log 26, wherein the data set 24 has been completely backed up at e.g. midnight and thereafter a log 26 of all writes has been maintained (e.g., at times t1–t6). In this example, each write log entry 26*a* includes updated data (data) and the address (addr) in the data set where the updated data is to be stored, and a corresponding time stamp (ts). The data set at each time t1–t6 is also shown in FIG. 4A. The backed-up data set 24 and the write log 26 allows returning to the state of the data set 24 at any time before the current state of the data set (e.g., at time t6), by restoring the backed-up (baseline) data set 24 and then executing all writes from that log 26 up until that time. For example, if data for address addr=0 (e.g., logical block address 0) were updated at time t2, but then corrupted at time t5, then the data from addr=0 from time t2 can be retrieved by restoring the baseline backup and running the write log through time t2. The log file 26 is first written in the RAID mirror area 20 and then data is transferred from the log file 26 in the RAID mirror area 20 to the final address in the RAID stripe area 22 (preferably as a background task), according to the present invention.

As the write log 26 may grow large, it is preferably offloaded to secondary storage devices such as tape drives, to free up disk space to log more changes to the data set 24. As such, the disk array 17 (FIG. 3C) is used as a write log cache in a three step process: (1) when the host needs to write data to a disk, rather than writing to the final destination in a disk drive, that data is first written to the log 26, satisfying the host (2) then when the disk drive is not busy, that data from the log 26 is transferred to the final destination data set on the disk drive, transparent to the host and (3) the log data is backed-up to e.g. tape to free up storage space, to log new data from the host. The log and the final destination data are maintained in a hybrid RAID configuration as described.

Figure 4B:
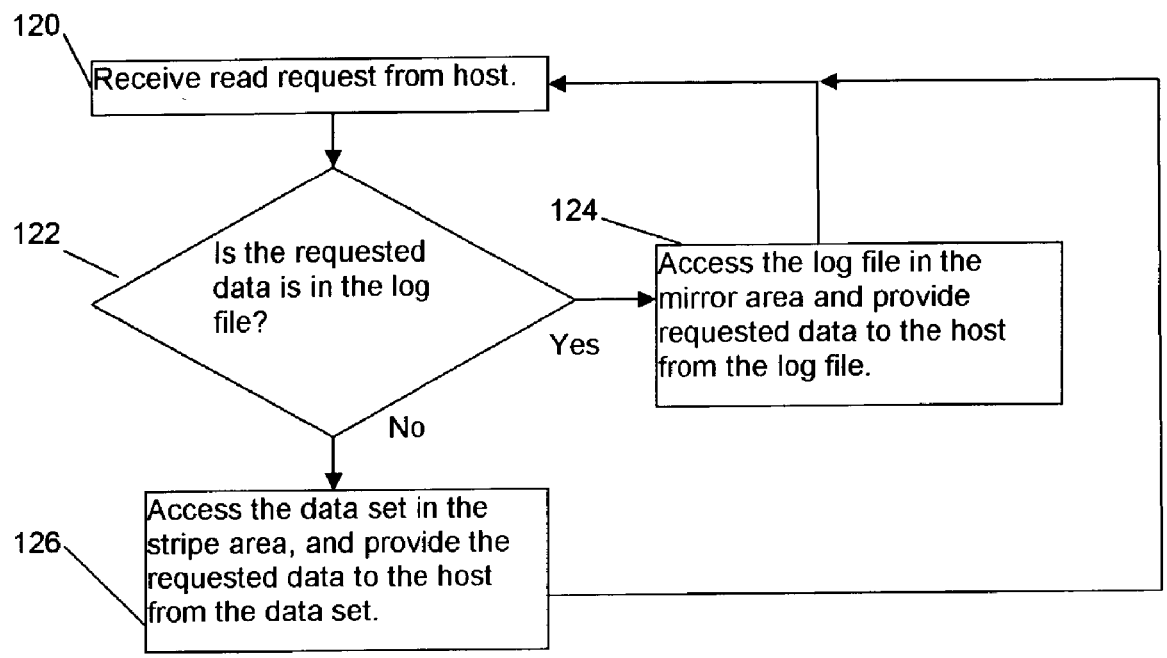
FIG. 4B shows an example flowchart of another embodiment of the steps of data storage according to the present invention.

Referring to the example steps in the flowchart of FIG. 4B, upon receiving a host read request (step 120), a determination is made if the requested data is in the write log 26, maintained as a cache in the mirror area 20, (i.e., cache hit) (step 122), and if so, the requested data is transferred to the host 20 from the log 26 (step 124). Statistically, since recently written data is more likely to be read back than previously written data, there is a tradeoff such that the larger the log area, the higher the probability that the requested data is in the log 26 (in the mirror area 20). When reading multiple blocks from the mirror area 20, different blocks can be read from different disk drives simultaneously, increasing read performance. In step 122, if there is no log cache hit, then the stripe area 22 is accessed to retrieve the requested data to provide to the host (step 126). Stripe read performance is inferior to a mirror but not as dramatically as write performance is inferior.

A such, the stripe area 22 is used for flushing the write log data, thereby permanently storing the data set in the stripe area 22, and also used to read data blocks that are not in the write log cache 26 in the mirror area 20. The hybrid RAID system 16 is an improvement over a conventional RAID stripe without a RAID mirror, since according to the present invention most recently written data is likely in the log 26 stored in the mirror area 20, which provides a faster read than a stripe. The hybrid RAID system provides equivalent of RAID mirror performance for all writes and for most reads since most recently written data is most likely to be read back. As such, the RAID stripe 22 is only accessed to retrieve data not found in the log cache 26 stored in the RAID mirror 20, whereby the hybrid RAID system 16 essentially provides the performance of a RAID mirror, but at cost effectiveness of a RAID stripe.

Therefore, if the stripe 22 is written to as a foreground process (e.g., real-time), then there is write performance penalty (i.e. the host is waiting for an acknowledgement that the write is complete). The log cache 26 permits avoidance of such real-time writes to the stripe 22. Because the disk array 17 is divided into two logical data areas (i.e., a mirrored log write area 20 and a striped read area 22) using a mirror configuration for log writes avoids the write performance penalty of a stripe. Provided the mirror area 20 is sufficiently large to hold all log writes that occur during periods of peak activity, updates to the stripe area 22 can be performed in the background. The mirror area 20 is essentially a write cache, and writing the log 26 to the mirror area 20 with background writes to the stripe area 22 allows the hybrid subsystem 16 to match mirror performance at stripe-like cost.

Figure 4C:
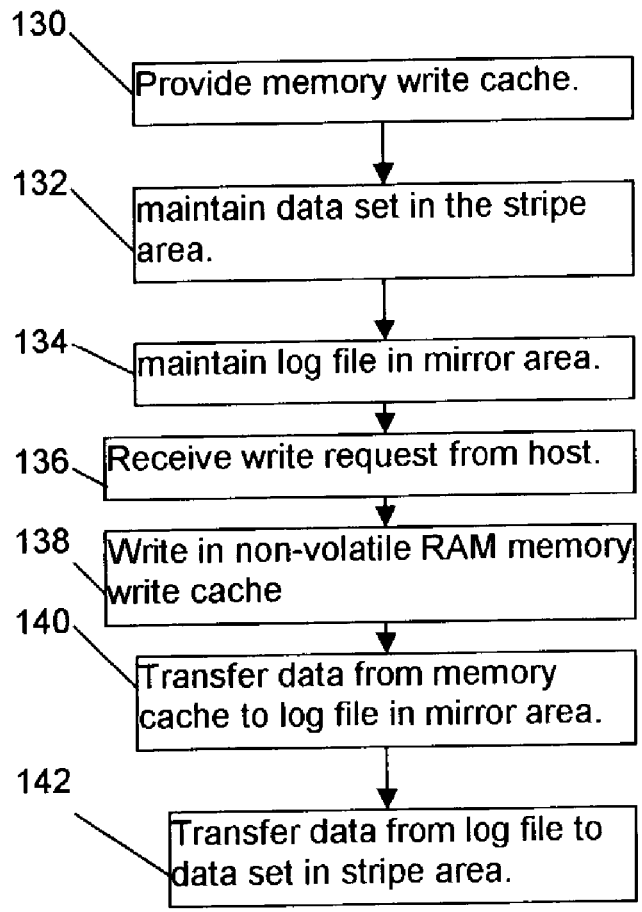
FIG. 4C shows an example flowchart of another embodiment of the steps of data storage according to the present invention
Figure 5A:
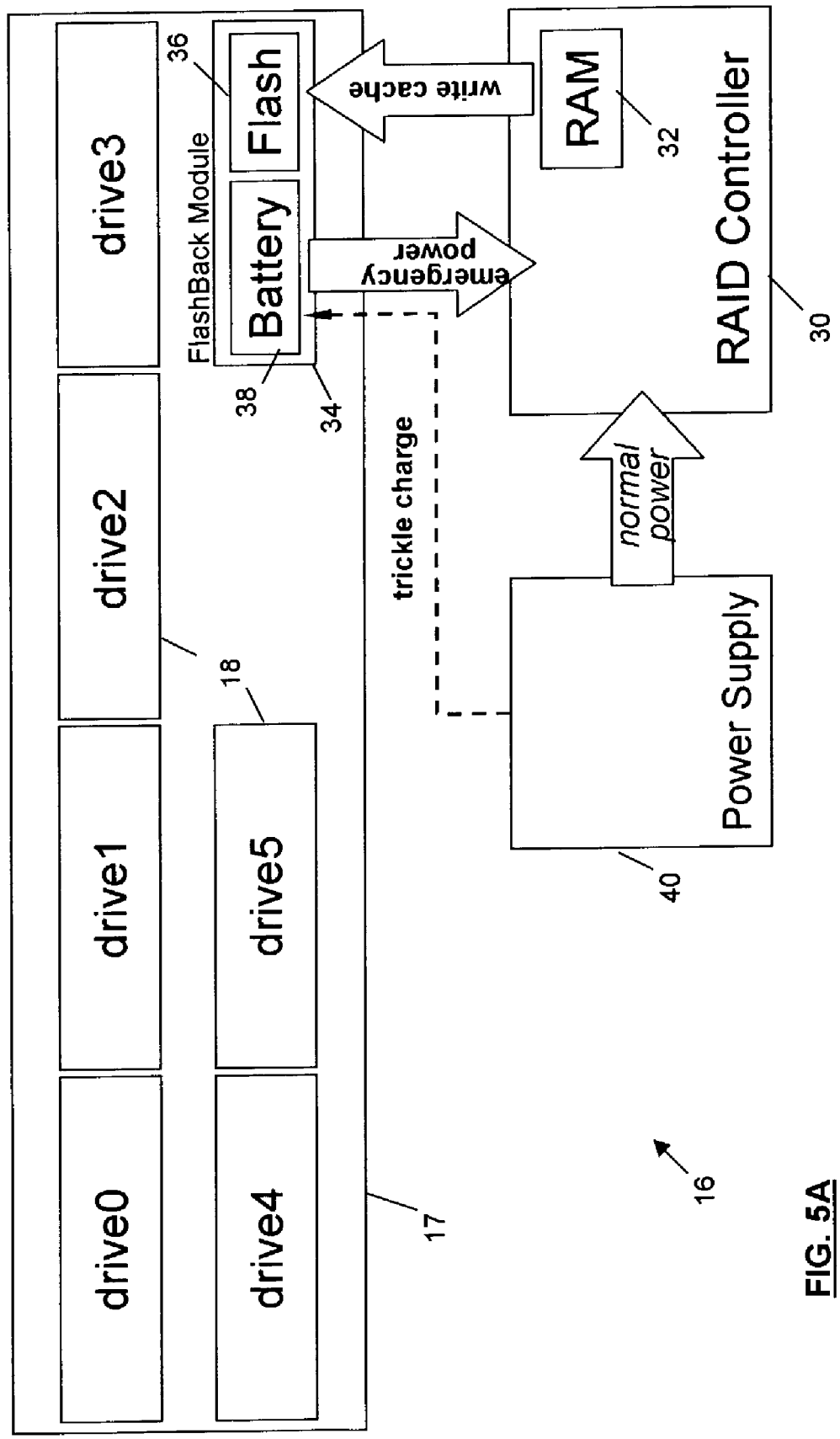
FIG. 5A shows another block diagram of the disk array of FIGS. 3A and 3B, further including a flashback module according to the present invention.

Referring to the example steps in the flowchart of FIG. 4C, to further enhance performance, according to the present invention, a cache memory (e.g., RAM write cache 32, FIG. 5A) is added in front of the log cache 26 in the disk array 17 (step 130), and as above the data set 24 and the log file 26 are maintained in the stripe area 22 and the mirror area 20, respectively (steps 132, 134). Upon receiving host write requests (step 136) incoming host blocks are first written to the RAM write cache 32 quickly and the host is acknowledged (step 138). The host perceives a faster write cycle than is possible if the data were written to disk while the host waited for an acknowledgement. This enhances the performance of conventional RAID system and further enhances the performance of the above hybrid RAID subsystem 16. The host data in the RAM write cache 32 is copied sequentially to the log 26 in the mirror area 20 (i.e., disk mirror write cache) (step 140), and the log data is later copied to the data set 24 in the stripe area 22 (i.e., disk stripe data set) e.g. as a background process (step 142). Sequential writes to the disk mirror write cache 26 and random writes to the disk stripe data set 24, provide fast sequential writes.

However, power failure while the data is en-route to disk (e.g., to the write log cache on disk) through the RAM write cache 32 can result in data loss because RAM is volatile. Therefore, as shown in the example block diagram of another embodiment of a hybrid RAID subsystem 16 in FIG. 5A, a flashback module 34 (backup module) can be added to the disk array 17 to protect RAM cache data according to the present invention. Without the module 34, write data would not be secure until stored at its destination address on disk.

Figure 5B:
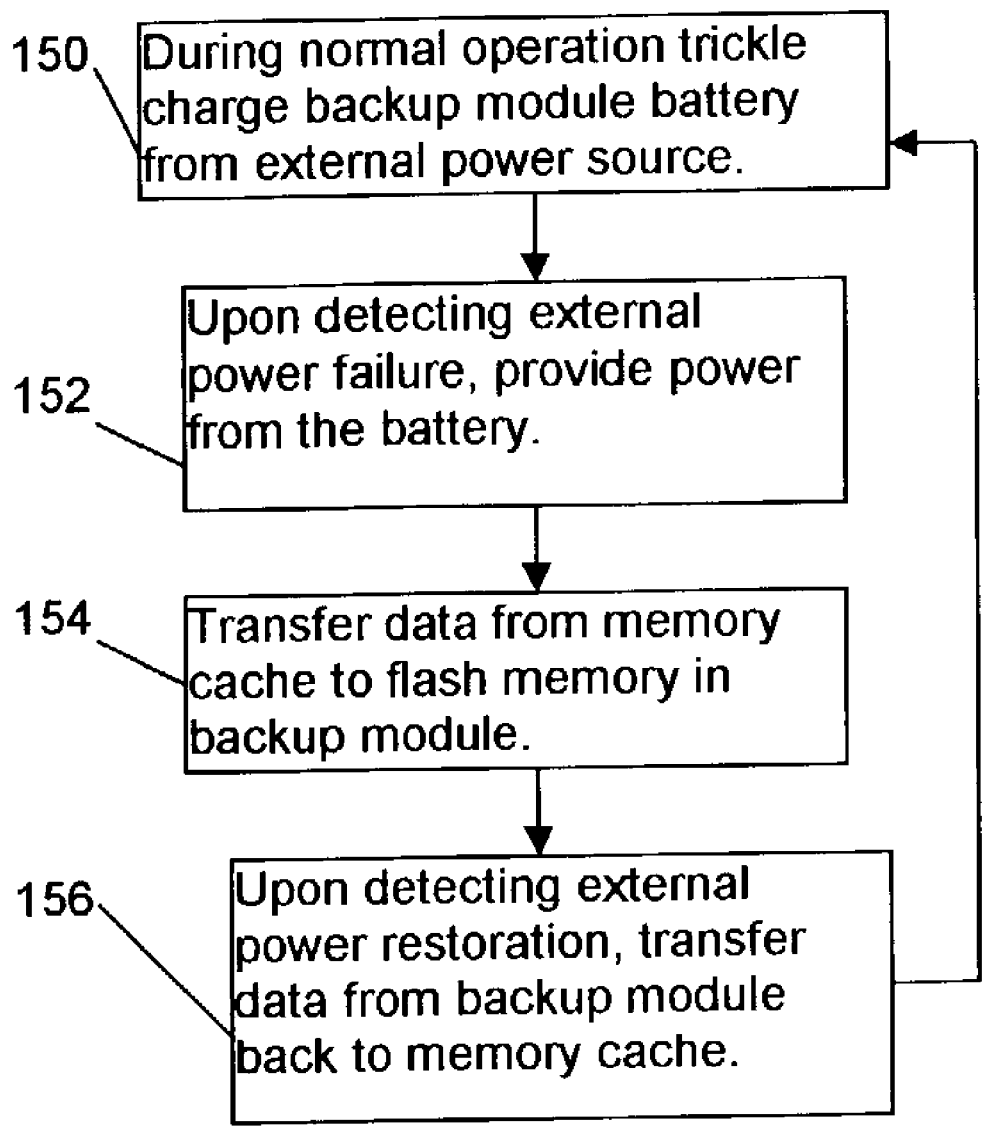
FIG. 5B shows an example flowchart of another embodiment of the steps of data storage according to the present invention.

The module 34 includes a non-volatile memory 36 such as Flash memory, and a battery 38. Referring to the example steps in the flowchart of FIG. 5B, during normal operations, the battery 38 is trickle charged from an external power source 40 (step 150). Should any power failure then occur, the battery 38 provides the RAID controller 30 with power sufficient (step 152) to transfer the contents of the RAM write cache 32 to the flash memory 36 (step 154). Upon restoration of power, the contents of the flash memory 36 are transferred back to the RAM write cache 32, and normal operations resume (step 156). This allows acknowledging the host write request (command) once the data is written in the RAM cache 32 (which is faster than writing it to the mirror disks). Should a failure of an element of the RAID subsystem 16 preclude resumption of normal operations, the flashback module 34 can be moved to a another hybrid subsystem 16 to restore data from the flash memory 36. With the flashback module 34 protecting the RAM write cache 32 against power loss, writes can be accumulated in the RAM cache 32 and written to the mirrored disk log file 26 sequentially (e.g., in the background).

To minimize the size (and the cost) of the RAM write cache 32 (and thus the corresponding size and cost of flash memory 36 in the flashback module 34), write data should be transferred to disk as quickly as possible. Since sequential throughput of a hard disk drive is substantially better than random performance, the fastest way to transfer data from the RAM write cache 32 to disk is via the log file 26 (i.e., a sequence of address/data pairs above) in the mirror area 20. This is because when writing a data block to the mirror area 20, the data block is written to two different disk drives. Depending on the physical disk address of the incoming blocks from the host to be written, the disk drives of the mirror 20 may be accessed randomly. However, as a log file is written sequentially based on entries in time, the blocks are written to the log file in a sequential manner, regardless of their actual physical location in the data set 24 on the disk drives.

Figure 5C:
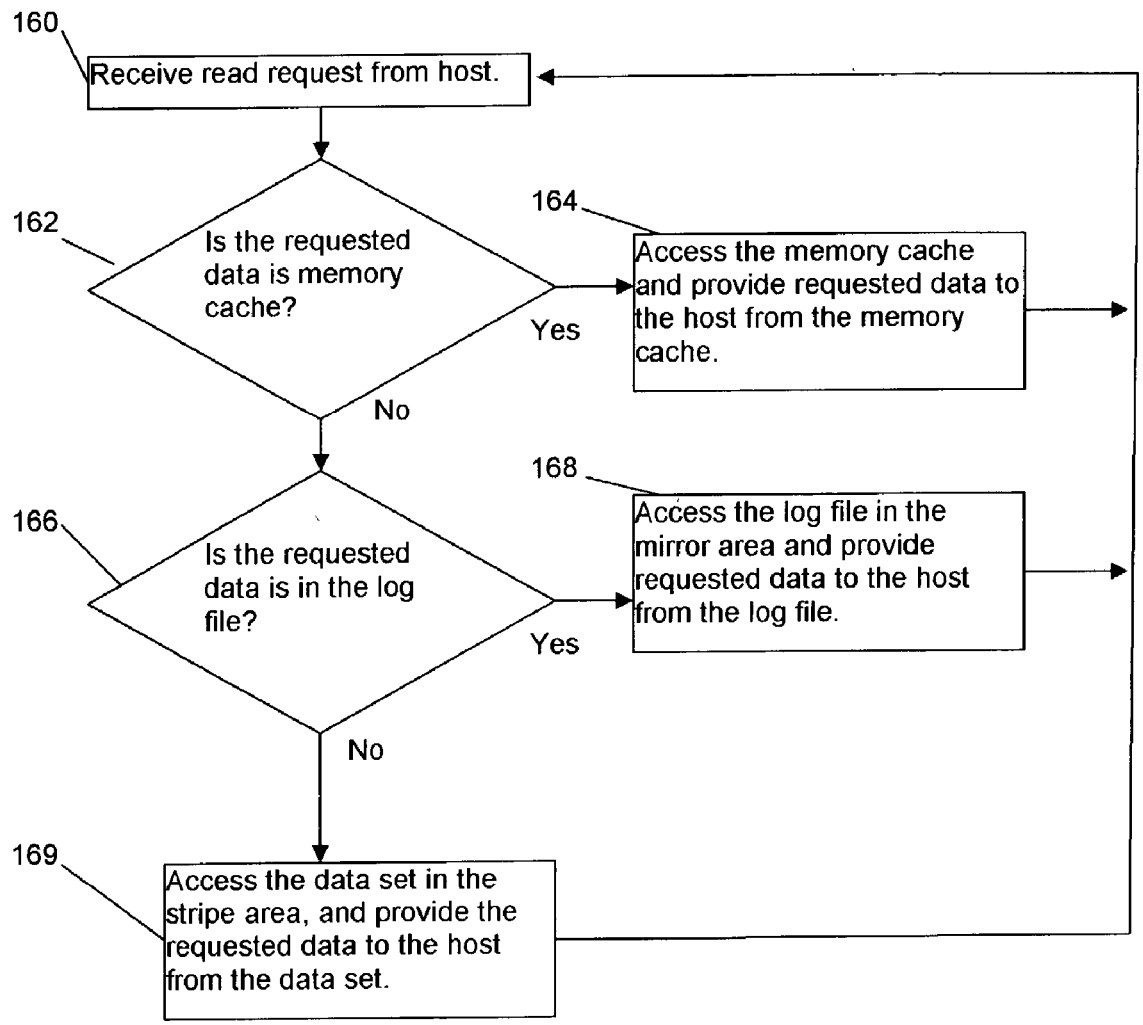
FIG. 5C shows an example flowchart of another embodiment of the steps of data storage according to the present invention.

In the above hybrid RAID system architecture according to the present invention, data requested by the host 29 from the RAID subsystem 16 can be in the RAM write cache 32, in the log cache area 26 in the mirror 20 area or in the general purpose stripe area 22. Referring to the example steps in the flowchart of FIG. 5C, upon receiving a host read request (step 160), a determination is made if the requested data is in the RAM cache 32 (step 162), and if so, the requested data is transferred to the host 29 from the RAM cache 32 (step 164). If the requested data is not in the RAM cache 32, then a determination is made if the requested data is in the write log file 26 in the mirror area 20 (step 166), and if so, the requested data is transferred to the host from the log 26 (step 168). If the requested data is not in the log 26, then the data set 24 in the stripe area 22 is accessed to retrieve the requested data to provide to the host (step 169).

Since data in the mirror area 20 is replicated, twice the number of actuators are available to pursue read data requests effectively doubling responsiveness. While this mirror benefit is generally recognized, the benefit may be enhanced because the mirror does not contain random data but rather data that has recently been written. As discussed, because the likelihood that data will be read is probably directly proportional to the time since the data has been written, the mirror area 20 may be more likely to contain the desired data. A further acceleration can be realized if the data is read back in the same order it was written regardless of the potential randomness of the final data addresses since the mirror area 20 stores data in the written order and a read in that order creates a sequential stream.

Figure 6A:
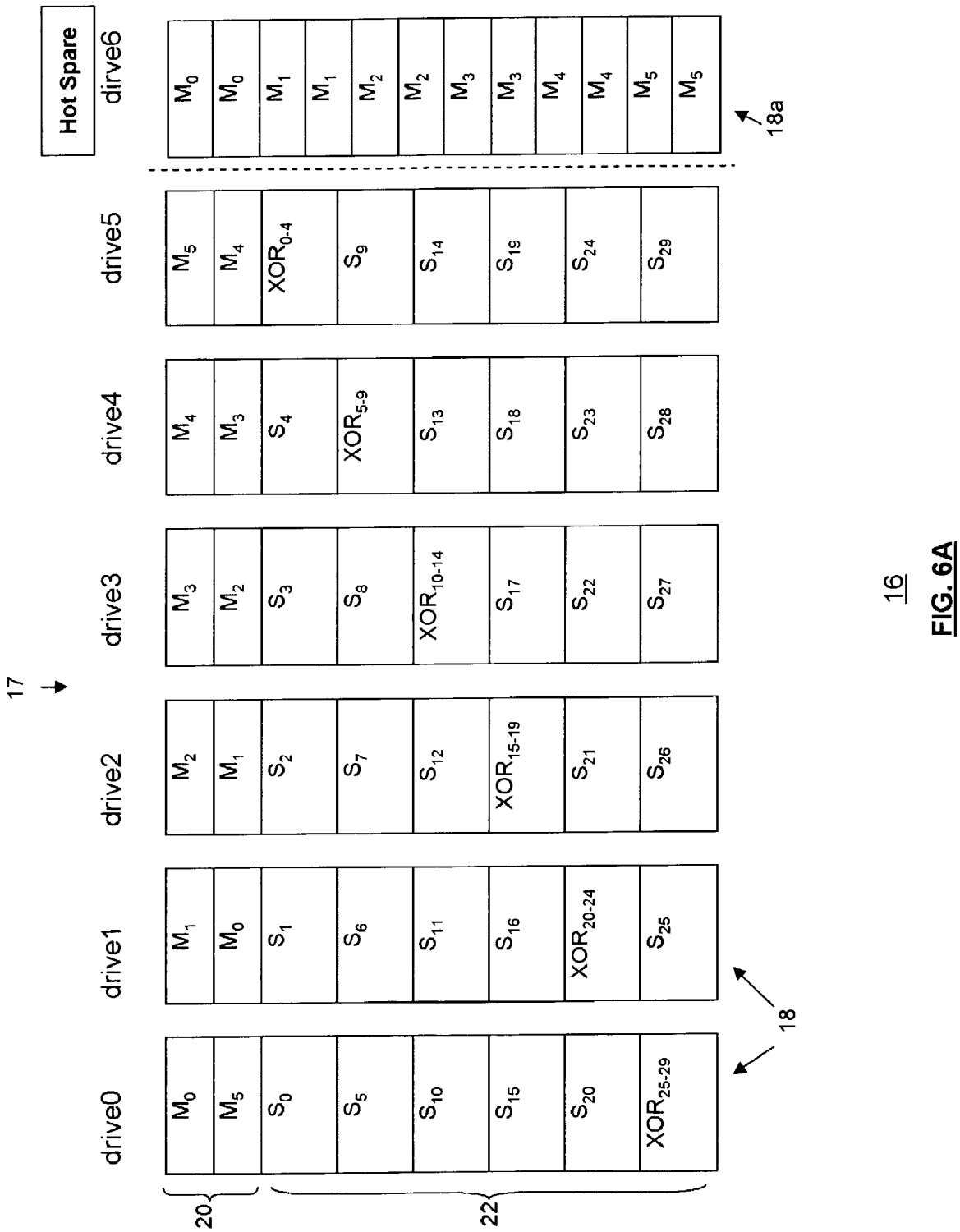
FIG. 6A shows a block diagram of another example hybrid RAID data organization in a disk array including a hot spare used as a temporary RAID mirror according to the present invention.

According to another aspect of the present invention, read performance of the subsystem 16 can further be enhanced. In a conventional RAID system, one of the disk drives in the array can be reserved as a spare disk drive ("hot spare"), wherein if one of the other disk drives in the array should fail, the hot spare is used to take the place of that failed drive. According to the present invention, read performance can be further enhanced by pressing a disk drive normally used as a hot spare in the disk array 17, into temporary service in the hybrid RAID subsystem 16. FIG. 6A shows the hybrid RAID subsystem 16 of FIG. 3A, further including a hot spare disk drive 18a (i.e., drive6) according to the present invention.

Figure 6B:
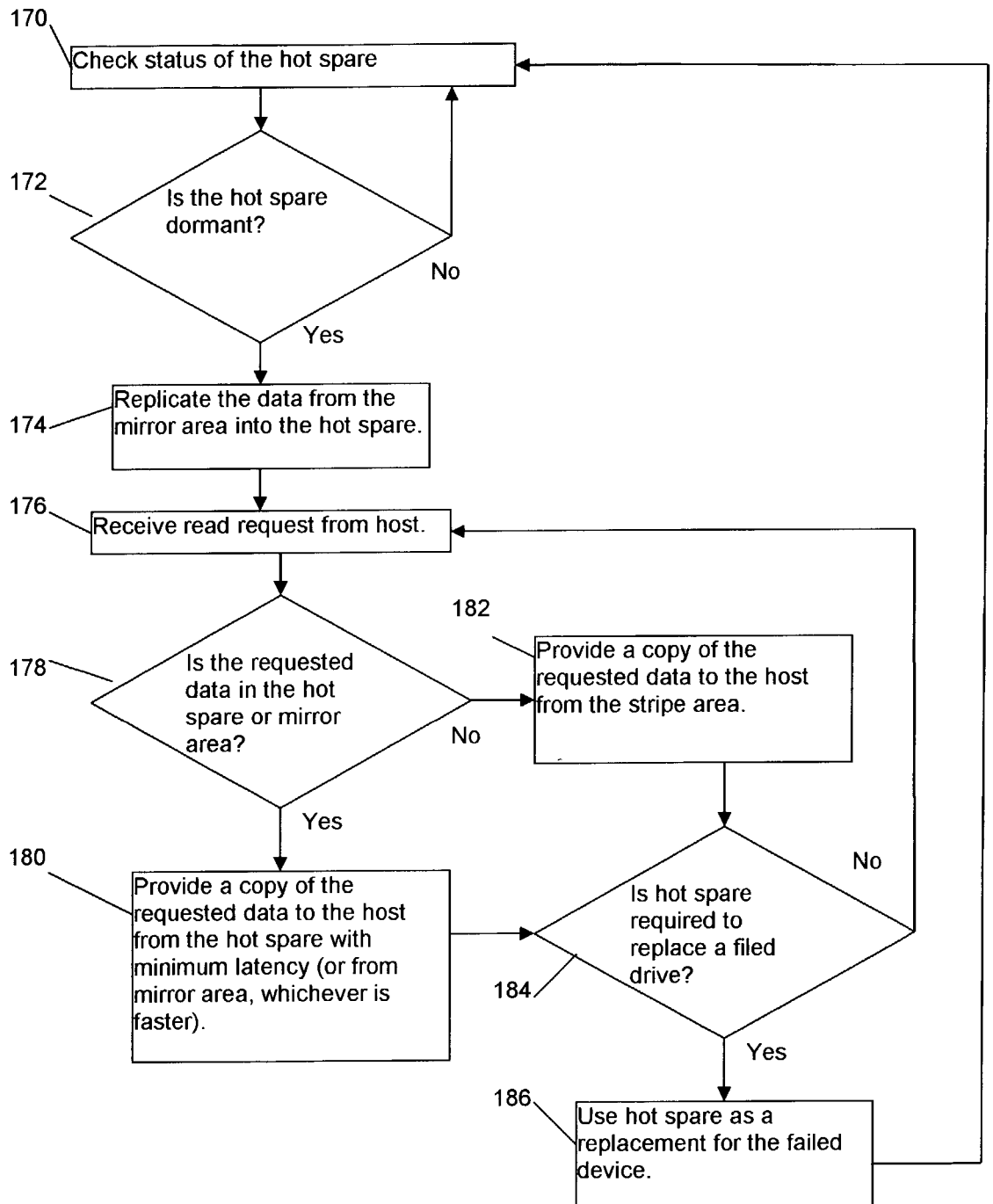
FIG. 6B shows an example flowchart of another embodiment of the steps of data storage according to the present invention.

Referring to the example steps in the flowchart of FIG. 6B, according to the present invention, the status of the hot spare 18a is determined (step 170) and upon detecting the hot spare 18a is lying dormant (i.e., not being used as a failed device replacement) (step 172), the hot spare 18a is used to replicate the data in the mirrored area 20 of the hybrid RAID subsystem 16 (step 174). Then upon receiving a read request from the host (step 176), it is determined if the requested data is in the hot spare 18a and the mirror area 20 (step 178). If so, a copy of the requested data is provided to the host from the hot spare 18a with minimum latency or from the mirror area 20, if faster (180). Otherwise, a copy of a requested data is provided to the host from the mirror area 20 or the stripe area 22 (step 182). Thereafter, it is determined if the hot spare 18a is required to replace a failed disk drive (step 184). If not, the process goes back to step 176, otherwise the hot spare 18a is used to replace the failed disk drive (step 186).

As such, in FIG. 6A should any disk drive 18 in the array 17 fail, the hot spare 18a can immediately be delivered to take the place of that failed disk drive without increasing exposure to data loss from a single disk drive failure. For example, if drive1 fails, drive0 and drive2–drive5 can start using the spare drive6 and rebuild drive6 to contain data of drive1 prior to failure. However, while all the disk drives 18 of the array 17 are working properly, the replication of the mirror area 20 would make the subsystem 16 more responsive to read requests by allowing the hot spare 18a to supplement the mirror area 20.

Depending upon the size of the mirrored area 20, the hot spare 18a may be able to provide multiple redundant data copies for further performance boost. For example, if the hot spare 18a matches the capacity of the mirrored area 20 of the array 17, the mirrored area data can then be replicated twice on the hot spare 18a. For example, in the hot spare 18a data can be arranged wherein the data is replicated on each concentric disk track (i.e., one half of a track contains a copy of that which is on the other half of that track). In that case, rotational latency of the hot spare 18a in response to random requests is effectively halved (i.e., smaller read latency).

Figure 6C:
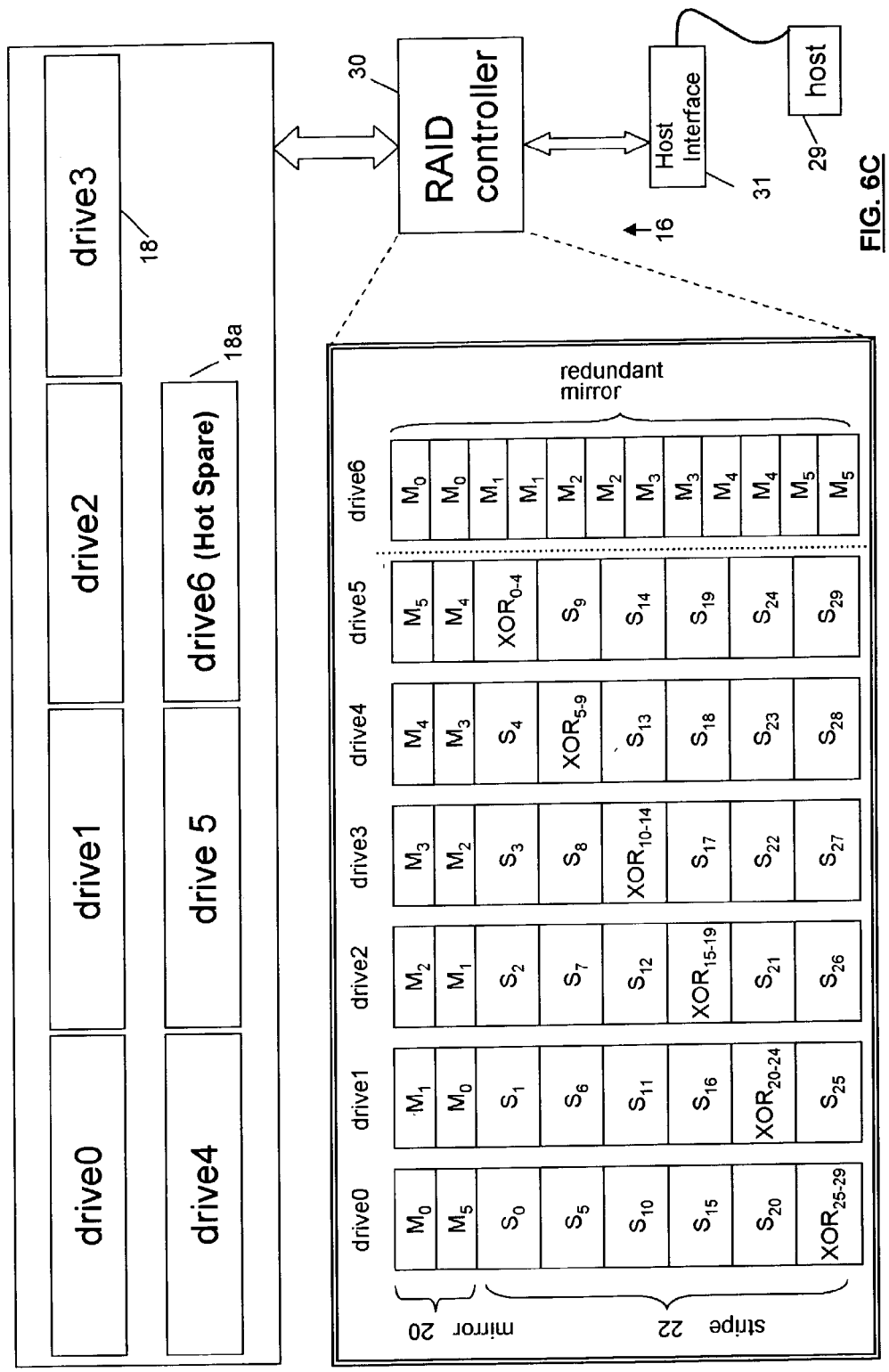
FIG. 6C shows a block diagram of an example RAID subsystem logically configured as the hybrid RAID data organization of FIG. 6A that further includes a hot spare used as a temporary RAID mirror.

As such, the hot spare 18a is used to make the mirror area 20 of the hybrid RAID subsystem 16 faster. FIG. 6C shows an example block diagram of a hybrid RAID subsystem 16 including a RAID controller 30 that implements the hybrid RAID data organization of FIG. 6A, for seven disk drives (drive0–drive6), wherein drive6 is the hot spare 18a. Considering drive0–drive1 in FIG. 6C, for example, M0 data is in drive0 and is duplicated in drive1, whereby drive1 protects drive0. In addition, M0 data is written to the spare drive6 using replication, such that if requested M0 data is in the write log 26 in the mirror area 20, it can be read back from drive0, drive1, or the spare drive6. Since M0 data is replicated twice in drive6, drive6 appears to have high r.p.m. because as described, replication lowers read latency. Spare drive6 can be configured to store all the mirrored blocks in a replicated fashion, similar to that for M0 data, to improve the read performance of the hybrid subsystem 16.

Because a hot spare disk drive should match capacity of other disk drives in the disk array (primary array) and since in this example the mirror area data (M0–M5) is half the capacity of a disk drive 18, the hot spare 18a can replicate the mirror area 20 twice. If the hot spare 18a includes a replication of the mirror area, the hot spare 18a can be removed from the subsystem 16 and backed-up. The backup can be performed off-line, not using network bandwidth. A new baseline could be created from the hot spare 18a.

If for example, previously a full backup of the disk array has been made to tape, and that the hot spare 18a contains all writes since that backup, then the backup can be restored from tape to a secondary disk array and then all writes from the log file 26 written to the stripe 22 of the secondary disk array. To speed this process only the most recent update to a given block need be written. The order of writes need not take place in a temporal order but can be optimized to minimize time between reads of the hot spare and/or writes to the secondary array. The stripe of the secondary array is then in the same state as that of the primary array, as of the time the hot spare was removed from the primary array. Backing up the secondary array to tape at this point creates a new baseline that can then be updated with newer hot spares over time to create newer baselines facilitating fast emergency restores. Such new baseline creation can be done without a host but rather with an appliance including a disk array and a tape drive. If the new baseline tape backup fails, the process can revert to the previous baseline and a tape backup of the hot spare.

Figure 7A:
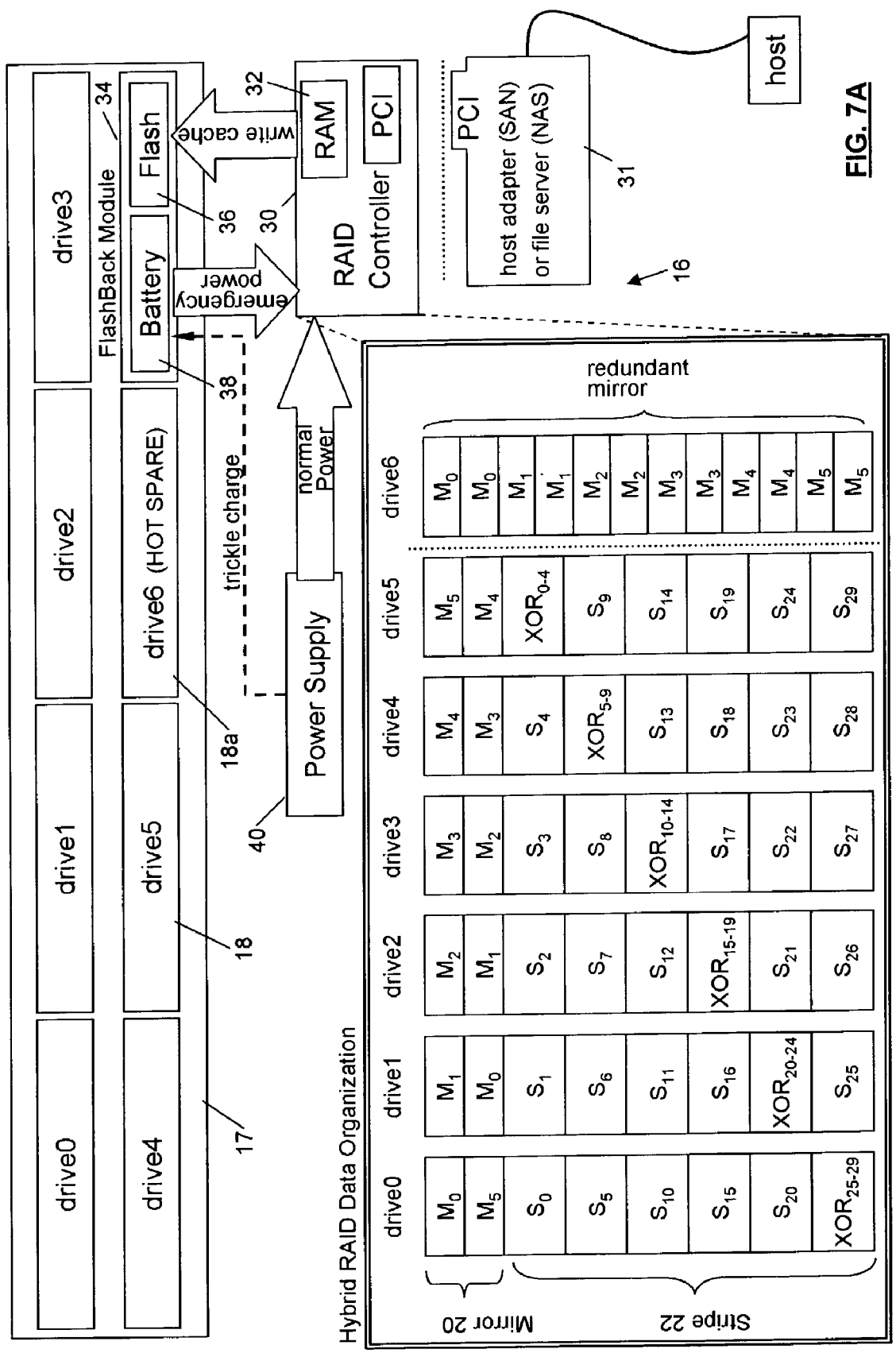
FIG. 7A shows a block diagram of another disk array including a hybrid RAID data organization using stripe and mirror configurations, and further including a hot spare as a redundant mirror and a flashback module, according to the present invention.
Figure 7B:
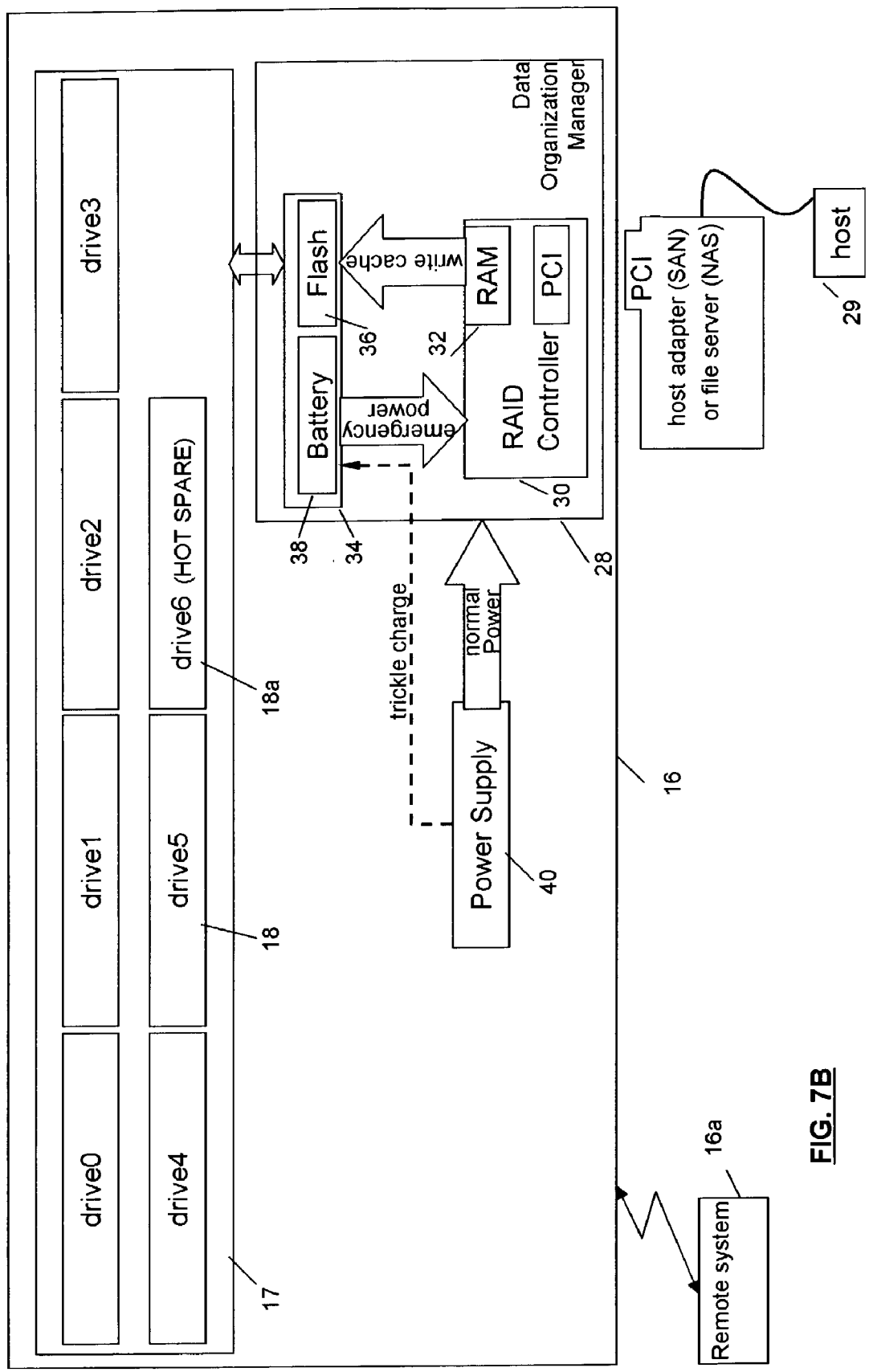
FIG. 7B shows a block diagram of another disk array including hybrid RAID data organization using stripe and mirror configurations, and further including a hot spare as a redundant mirror and a flashback module, according to the present invention.

FIG. 7A shows a block diagram of an embodiment of a hybrid RAID subsystem 16 implementing said hybrid RAID data organization, and further including a hot spare 18a as a redundant mirror and a flashback module 34, according to the present invention. Writing to the log 26 in the mirror area 20 and the flashback module 34, removes the write performance penalty normally associated with replication on a mirror. Replication on a mirror involves adding a quarter rotation to all writes. When the target track is acquired, average latency to one of the replicated sectors is one quarter rotation but half a rotation is need to write the other sector. Since average latency on a standard mirror is half a rotation, an additional quarter rotation is required for writes. With the flashback module 34, acknowledgment of write non-volatility to the host can occur upon receipt of the write in RAM write cache 32 in the RAID controller 30. Writes from RAM write cache 32 to the disk log file write cache 26 occur in the background during periods of non-peak activity. By writing sequentially to the log file 26, the likelihood of such non-peak activity is greatly increased. FIG. 7B shows a block diagram of another embodiment of hybrid RAID subsystem 16 of FIG. 7A, wherein the flashback module 34 is part of the data organization manager 28 that includes the RAID controller 30.

Another embodiment of a hybrid RAID subsystem 16 according to the present invention provides data block service and can be used as any block device (e.g., single disk drive, RAID, etc.). Such a hybrid RAID subsystem can be used in any system wherein a device operating at a data block level can be used. FIG. 8A shows an example of utilizing an embodiment of a hybrid RAID subsystem 16 according to the present invention in a example block device such as storage area network (SAN) 42. In SAN, connected devices exchange data blocks.

Figure 8B:
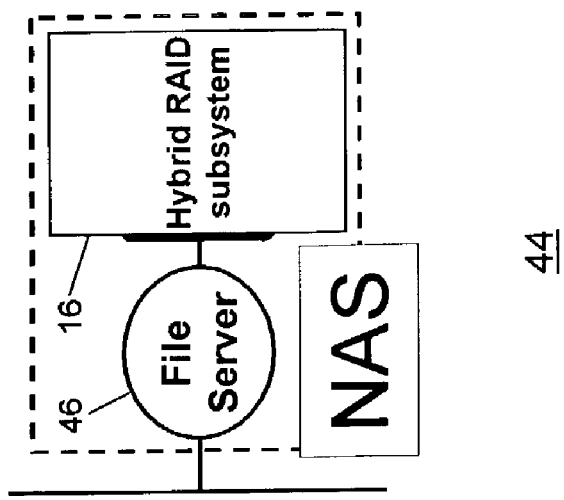
FIG. 8B shows an example of utilizing a hybrid RAID as a network attached storage (NAS), according to the present invention.
Figure 8A:
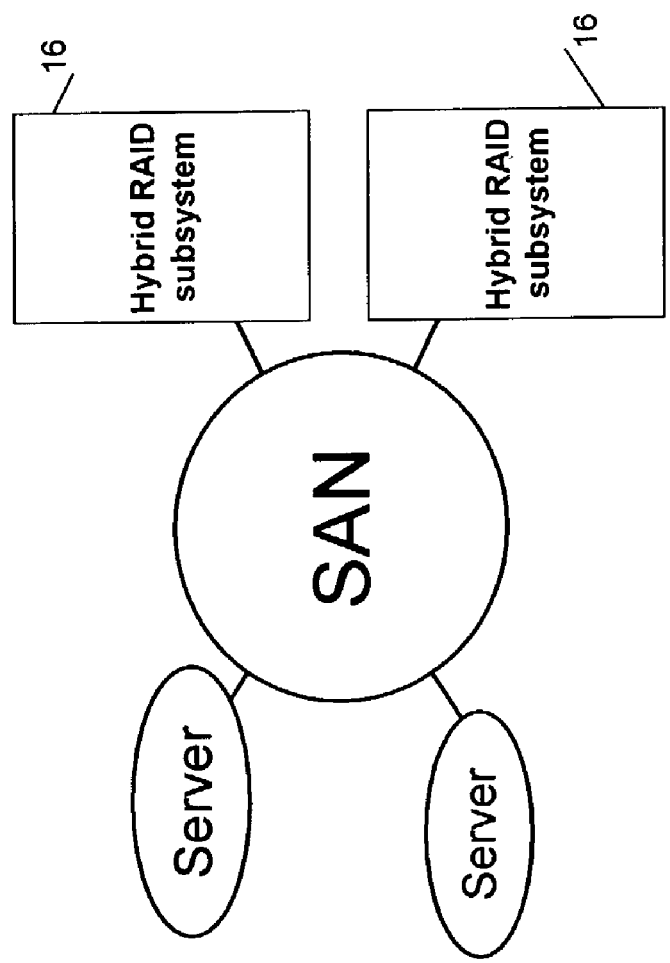
FIG. 8A shows an example of utilizing a hybrid RAID subsystem in a storage area network (SAN), according to the present invention.

FIG. 8B shows an example of utilizing an embodiment of a hybrid RAID subsystem 16 according to the present invention as a network attached storage (NAS) in a network 44. In NAS, connected devices exchange files, as such a file server 46 is positioned in front of the hybrid RAID subsystem 16. The file server portion of a NAS device can be simplified with a focus solely on file service, and data integrity is provided by the hybrid RAID subsystem 16.

Figure 8C:
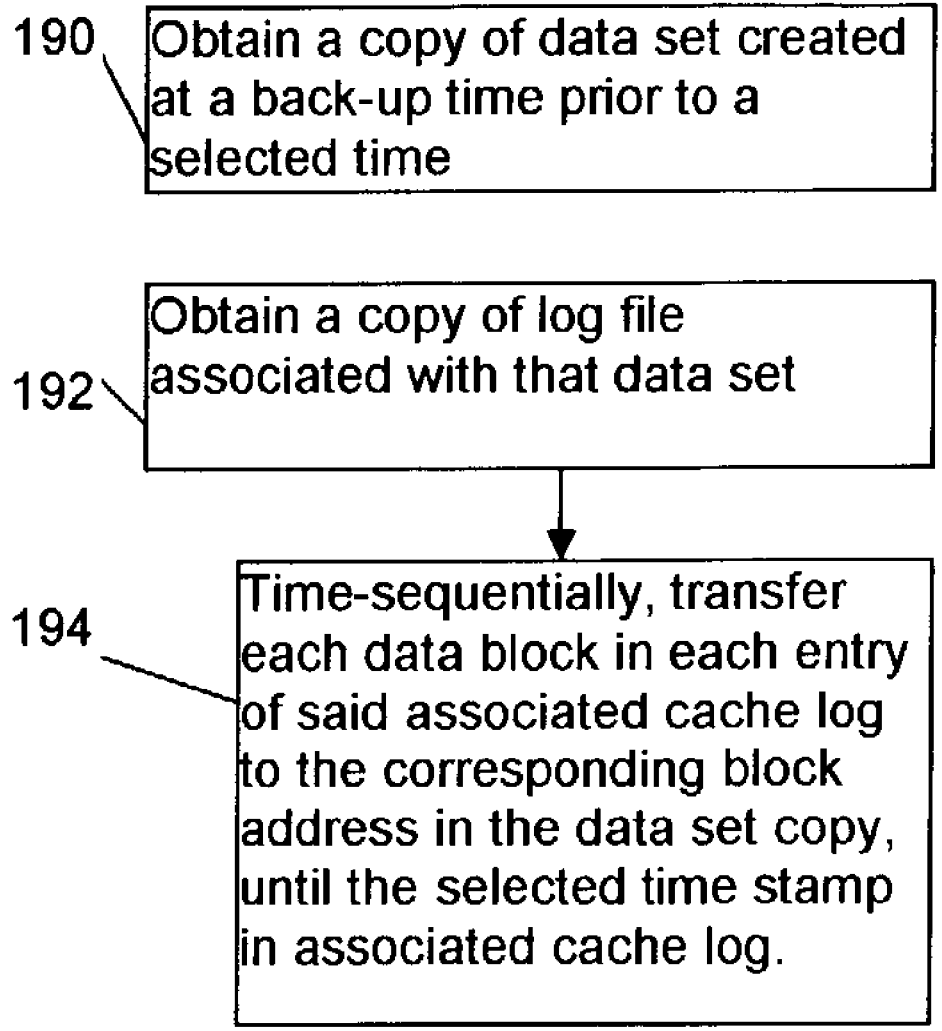
FIG. 8C shows an example flowchart of another embodiment of the steps of data storage according to the present invention.

The present invention provides further example enhancements to the hybrid RAID subsystem, described herein below. As mentioned, the mirror area 20 (FIG. 3A) acts as a temporary store for the log cache 26, prior to storing the write data in its final location in the stripe 22. Before purging the data from the temporary mirror 20, the log 26 can be written sequentially to an archival storage medium such as tape. Then, to return to a prior state of the data set, if a baseline backup of the entire RAID subsystem stripe 22 is created just before the log files are archived, each successive state of the RAID subsystem 16 can be recreated by re-executing the write requests within the archived log file system. This would allow any earlier state of the stripe 22 of the RAID subsystem 16 to be recreated (i.e., infinite rollback or rewind). This is beneficial e.g. in allowing recovery from user error such as accidentally erasing a file, in allowing recovery from a virus infection, etc. Referring to the example steps in the flowchart of FIG. 8C, to recreate a state of the data set 24 in the stripe 22 at a selected time, a copy of the data set 24 created at a back-up time prior to the selected time, is obtained (step 190) and a copy of cache log 26 associated with said data set copy is obtained (step 192). Said associated cache log 26 includes entries 26a (FIG. 4A) created time-sequentially immediately subsequent to said back-up time. Each data block in each entry of said associated cache log 26 is time-sequentially transferred to the corresponding block address in the data set copy, until a time stamp indicating said selected time is reached in an entry 26*a* of the associated cache log (step 194).

The present invention further provides compressing the data in the log 26 stored in the mirror area 20 of the hybrid RAID system 16 for cost effectiveness. Compression is not employed in a conventional RAID subsystem because of variability in data redundancy. For example, a given data block is to be read, modified and rewritten. If the read data consumes the entire data block and the modified data does contain as much redundancy as did the original data, then the compressed modified data cannot fit in the data block on disk.

However, a read/modify/write operation is not a valid operation in the mirror area 20 in the present invention because the mirror area 20 contains a sequential log file of writes. While a given data block may be read from the mirror area 20, after any modification, the writing of the data block would be appended to the existing log file stream 26, not overwritten in place. Because of this, variability in compression is not an issue in the mirror area 20. Modern compression techniques can e.g. halve the size of typical data, whereby use of compression in the mirror area 20 effectively e.g. doubles its size. This allows doubling the mirror area size or cutting the actual mirror area size in half, without reducing capacity relative to a mirror area without compression. The compression technique can similarly be performed for the RAM write cache 32.

For additional data protection, in another version of the present invention, the data in the RAID subsystem 16 may be replicated to a system 16*a* (FIG. 7B) at a remote location. The remote system 16*a* may not be called upon except in the event of an emergency in which the primary RAID subsystem 16 is shut down. However, the remote system 16*a* can provide further added value in the case of the present invention. In particular, the primary RAID subsystem 16 sends data in the log file 26 in mirror area 20 to the remote subsystem 16*a* wherein in this example the remote subsystem 16*a* comprises a hybrid RAID subsystem according to the present invention. If the log file data is compressed the transmission time to the remote system 16*a* can be reduced. Since the load on the remote subsystem 16*a* is less than that on the primary subsystem 16 (i.e., the primary subsystem 16 responds to both read and write requests whereas the remote subsystem 16*a* need only respond to writes), the remote subsystem 16*a* can be the source of parity information for the primary subsystem 16. As such, within the remote subsystem 16*a*, in the process of writing data from the mirror area to its final address on the stripe in the subsystem 16*a*, the associated parity data is generated. The remote subsystem 16*a* can then send the parity data (preferably compressed) to the primary subsystem 16 which can then avoid generating parity data itself, accelerating the transfer process for a given data block between the mirror and the stripe areas in the primary subsystem 16.

The present invention goes beyond standard RAID by protecting data integrity, not just providing device reliability. Infinite roll-back provides protection during the window of vulnerability between backups. A hybrid mirror/stripe data organization results in improved performance. With the addition of the flashback module 34, a conventional RAID mirror is outperformed at a cost which approaches that of a stripe. Further performance enhancement is attained with replication on an otherwise dormant hot spare and that hot spare can be used by a host-less appliance to generate a new baseline backup.

The present invention can be implemented in various data processing systems such as Enterprise systems, networks, SAN, NAS, medium and small systems (e.g., in a personal computer a write log is used, and data transferred to the user data set in background). As such in the description herein, the "host" and "host system" refer to any source of information that is in communication with the hybrid RAID system for transferring data to, and from, the hybrid RAID subsystem.

The present invention has been described in considerable detail with reference to certain preferred versions thereof; however, other versions are possible. Therefore, the spirit and scope of the appended claims should not be limited to the description of the preferred versions contained herein.

What is claimed is:

1. A method for storing data from a host in a fault-tolerant storage subsystem having an array of failure independent data storage units, comprising the steps of;

dividing the data storage area on the data storage units into a logical mirror area and a logical stripe area;

when storing data from a host in the mirror area, duplicating the data by keeping a duplicate copy of the data on a pair of storage units; and when storing host data in the stripe area, storing data as stripes of blocks, including data blocks and associated error-correction blocks, and further storing the host data in a data set in the stripe area;

storing a log cache associated with said host data in the mirror area, wherein the log cache is duplicated in the mirror area, wherein the log cache comprises a write log having multiple time-sequential entries, each entry including a data block, the data block address in the data set, and a data block time stamp;

in response to a request from a host that is logically external to the storage subsystem, to write data to the storage subsystem for storage therein:

storing the host data in the log cache in the mirror area, wherein said host data is duplicated in the mirror area;

acknowledging completion of the write to the host;

copying said host data from the log cache in the mirror area to the data set in the stripe area by copying the host data in said log cache entry in the mirror area to said block address in the data set in the stripe area;

wherein said request from the host includes said host data and a block address in the data set for storing the host data, such that the step of storing the host data in the log cache in response to said host request further includes the steps of entering the host data, said block address and a time stamp in an entry in the log cache;

archiving said log cache entry in an archive; and purging said entry from the cache log.

2. A method for storing data from a host in a fault-tolerant storage subsystem having an array of failure independent data storage units, comprising the steps of:

dividing the data storage area on the data storage units into a logical mirror area and a logical stripe area;

when storing data from a host in the mirror area, duplicating the data by keeping a duplicate copy of the data on a pair of storage units;

when storing host data in the stripe area, storing data as stripes of blocks. including data blocks and associated error-correction blocks, and further storing the host data in a data set in the stripe area;

storing a log cache associated with said host data in the mirror area, wherein the log cache is duplicated in the mirror area, wherein the log cache comprises a write log having multiple time-sequential entries, each entry including a data block, the data block address in the data set, and a data block time stamp;

in response to a request from a host that is logically external to the storage subsystem, to write data to the storage subsystem for storage therein:

storing the host data in the log cache in the mirror area, wherein said host data is duplicated in the mirror area;

acknowledging completion of the write to the host;

copying said host data from the log cache in the mirror area to the data set in the stripe area by copying the host data in said log cache entry in the mirror area to said block address in the data set in the stripe area;

wherein said request from the host includes said host data and a block address in the data set for storing the host data, such that the step of storing the host data in the log cache in response to said host request further includes the steps of entering the host data, said block address and a time stamp in an entry in the log cache;

in response to a request to recreate a state of the data set at a selected time:

obtaining a copy of the data set created at a back-up time prior to the selected time;

obtaining a cache log associated with said data set copy, the associated cache log including entries created time-sequentially immediately subsequent to said back-up time; and time-sequentially transferring each data block in each entry of said associated cache log, to the corresponding block address in the data set copy, until said selected time stamp is reached in an entry of the associated cache log.

3. A method for storing data from a host in a fault-tolerant storage subsystem having an array of failure independent data storage units, comprising the steps of:

dividing the data storage area on the data storage units into a logical mirror area and a logical stripe area;

when storing data from a host in the mirror area, duplicating the data by keeping a duplicate copy of the data on a pair of storage units;

when storing host data in the stripe area, storing data as stripes of blocks, including data blocks and associated error-correction blocks;

storing the host data in a data set in the stripe area; storing a log cache associated with said host data in the mirror area, wherein the lo cache is duplicated in the mirror area;

wherein the storage subsystem further includes a cache memory, such that steps in response to a request to write data to the storage subsystem further include the steps of:

storing the data in the cache memory;

acknowledging completion of the write; and copying the data from the cache memory to the log cache in the mirror area;

providing a memory backup module including non-volatile memory and a battery, wherein the storage subsystem is normally powered from a power supply;

upon detecting power failure from the power supply, powering the cache memory and the non-volatile memory from the battery instead, and copying the data content of the cache memory to the non-volatile memory; and upon detecting restoration of power from the power supply, copying back said data content from the non-volatile memory to the cache memory.

4. The method of claim 3, wherein said cache memory comprises random access memory (RAM), and said non-volatile memory comprises flash memory (FLASH).

5. The method of claim 3, wherein said battery comprises a rechargeable battery that is normally trickle charged by the power supply.

6. A method for storing data from a host in a fault-tolerant storage subsystem having an array of failure independent data storage units. comprising the steps of:

dividing the data storage area on the data storage units into a logical mirror area and a logical stripe area;

when storing data from a host in the mirror area, duplicating the data by keeping a duplicate copy of the data on a pair of storage units;

when storing host data in the stripe area, storing data as stripes of blocks, including data blocks and associated error-correction blocks;

storing the host data in a data set in the stripe area:

storing a log cache associated with said host data in the mirror area, wherein the log cache is duplicated in the mirror area;

wherein one of the data storage units is reserved as a spare for use in case one of the other data storage units fails, the method further comprising the steps of, while the spare data storage unit is not in use:

replicating the log cache data stored in the mirror area into the spare storage unit, such that multiple copies of that data are stored in the spare storage unit; and upon receiving a request to read data from the data set, determining if the requested data is in the spare storage unit, and if so, selecting a copy of the requested data in the spare storage unit that can be provided with minimum read latency relative to other copies of the selected data, and providing the selected copy of the requested data.

7. A method for storing data from a host in a fault-tolerant storage subsystem having an array of failure independent data storage units, comprising the steps of:

dividing the data storage area on the data storage units into a logical mirror area and a logical stripe area;

when storing data from a host in the mirror area. duplicating the data by keeping a duplicate copy of the data on a pair of storage units;

when storing host data in the stripe area, storing data as stripes of blocks. including data blocks and associated error-correction blocks;

transmitting the log cache data to a remote fault tolerance data storage system;

the remote data storage system detennining parity associated error-correction blocks for the received log cache data, and transmitting the error-correction blocks to the storage subsystem, wherein, the step of storing data in the stripe area of the storage subsystem includes storing data as stripes of blocks, including data blocks and the associated error-correction blocks received from the remote storage system.

8. A fault-tolerant storage subsystem for storing data from a host, comprising:

an array of failure independent data storage units;

a controller that logically divides the data storage area on data the storage units into a logical mirror area and a logical stripe area, wherein the controller stores data from a host in the mirror area by duplicating the data and keeping a duplicate copy of the data on a pair of storage units, and the controller stores host data in the stripe area as stripes of blocks. including data blocks and associated error-correction blocks;

the controller further maintains a data set in the stripe area for string host data, and an associated log cache in the mirror area wherein the log cache is duplicated in the mirror area, the log cache comprises a write log having multiple time sequential entries, each entry including a data block, the data block address in the data set, and time stamp;

the controller copies said incoming data from the log cache in the mirror area to the data set in the stripe area, by copying the incoming data in said log cache entry in the mirror area to said block address in the data set in the stripe area;

in response to a request to write incoming data to the storage subsystem, the controller further; stores the incoming data in the log cache in the mirror area, wherein said host data is duplicated in the mirror area, and acknowledges completion of the write; said request includes said incoming data and a block address in the data set for storing the incoming data, and the controller enters the incoming data, said block address and a time stamp in an entry in the log cache;

wherein in response to a request to recreate a state of the data set at a selected time, the controller further:

obtains a copy of the data set created at a back-up time prior to the selected time;

obtains a cache log associated with said data set copy, the associated cache log including entries created time sequentially immediately subsequent to said back-up time; and time sequentially transfers each data block in each entry of said associated cache log, to the corresponding block address in the data set copy, until said selected time stamp is reached in an entry of the associated cache log.

9. A fault-tolerant storage subsystem for storing data from a host, comprising:

an array of failure independent data storage units;

a controller that logically divides the data storage area on data the storage units into a logical mirror area and a logical stripe area, wherein the controller stores data from a host in the mirror area by duplicating the data and keeping a duplicate copy of the data on a pair of storage units, and the controller stores host data in the stripe area as stripes of blocks, including data blocks and associated error-correction blocks; the controller further maintaining a data set in the stripe area for string host data, and an associated log cache in the mirror area wherein the log cache is duplicated in the mirror area;

a cache memory, wherein: in response to a request to write data to the data set, the controller stores the data in the cache memory, and acknowledges completion of the write; and the controller further copies the data from the cache memory to the log cache in the mirror area;

a memory backup module including non-volatile memory and a battery, wherein the storage subsystem is normally powered from a power supply;

wherein, upon detecting power failure from the power supply, the controller powers the cache memory and the non-volatile memory from the battery instead, and copies the data content of the cache memory to the non-volatile memory, and upon detecting restoration of power from the power supply, the controller copies back said data content from the non-volatile memory to the cache memory.

10. The storage subsystem of claim 9, wherein said cache memory comprises random access memory (RAM), and said non-volatile memory comprises flash memory (FLASH).

11. The storage subsystem of claim 9, wherein said battery comprises a rechargeable battery that is normally trickle charged by the power supply.

12. A fault-tolerant storage subsystem for storing data from a host, comprising;

an array of failure independent data storage units; and a controller that logically divides the data storage area on data the storage units into a logical mirror area and a logical stripe area, wherein the controller stores data from a host in the mirror area by duplicating the data and keeping a duplicate copy of the data on a pair of storage units, and the controller stores host data in the stripe area as stripes of blocks, including data blocks and associated error-correction blocks the controller further maintaining a data set in the stripe area for string host data, and an associated log cache in the mirror area wherein the log cache is duplicated in the mirror area wherein the controller further reserves one of the storage units as a spare for use in case one of the other storage units fails, such that while the spare storage unit is not in use, the controller further:

replicates the log cache data stored in the mirror area into the spare storage unit, such that multiple copies of that data are stored in the spare storage unit; and upon receiving a request to read data from the data set, the controller determines if the requested data is in the spare storage unit, and if so, the controller selects a copy of the requested data in the spare storage unit that can be provided with minimum read latency relative to other copies of the selected data, and provides the selected copy of the requested data.

13. A data organization manager for a fault-tolerant storage subsystem having an array of failure independent data storage units for storing data from a host, the data organization manager comprising:

a controller that logically divides the data storage area on the data storage units into a hybrid of logical mirror area and a logical stripe area, wherein the controller stores data from a host in the mirror area by duplicating the data and keeping a duplicate copy of the data on a pair of storage units, and the controller stores host data in the stripe area as stripes of blocks, including data blocks and associated error-correction blocks; the controller further maintaining a data set in the stripe area for storing host data, and an associated log cache in the mirror area wherein the log cache is duplicated in the mirror area; the log cache comprising a write log having multiple time sequential entries, each entry including a data block, the data block address in the data set, and time stamp;

wherein in response to a request to write data to the storage subsystem, the controller further; stores the data in the log cache in the mirror area, wherein said host data is duplicated in the mirror area, and acknowledges completion of the write;

said request includes said data and a block address in the data set for storing the data, and the controller enters the data, said block address and a time stamp in an entry in the log cache;

the controller copies said data from the log cache in the mirror area to the data set in the stripe area, by copying the data in said log cache entry in the mirror area to said block address in the data set in the stripe area;

wherein in response to a request to recreate a state of the data set at a selected time, the controller further:

obtains a copy of the data set created at a back-up time prior to the selected time;

obtains a cache log associated with said data set copy, the associated cache log including entries created time sequentially immediately subsequent to said back-up time; and time sequentially transfers each data block in each entry of said associated cache log, to the corresponding block address in the data set copy, until said selected time stamp is reached in an entry of the associated cache log.

14. A data organization manager for a fault-tolerant storage subsystem having an array of failure independent data storage units for storing data from a host, the data organization manager comprising:

a controller that logically divides the data storage area on the data storage units into a hybrid of logical mirror area and a logical stripe area, wherein the controller stores data from a host in the mirror area by duplicating the data and keeping a duplicate copy of the data on a pair of storage units, and the controller stores host data in the stripe area as stripes of blocks, including data blocks and associated error-correction blocks the controller further maintaining a data set in the stripe area for storing host data, and an associated log cache in the mirror area wherein the log cache is duplicated in the mirror area;

a cache memory, wherein; in response to a request to write data to the data set, the controller stores the data in the cache memory, and acknowledges completion of the write; and the controller further copies the data from the cache memory to the log cache in the mirror area;

a memory backup module including non-volatile memory and a battery, wherein the storage subsystem is normally powered from a power supply;

wherein, upon detecting power failure from the power supply, the controller powers the cache memory and the non-volatile memory from the battery instead, and copies the data content of the cache memory to the non-volatile memory, and upon detecting restoration of power from the power supply, the controller copies back said data content from the non-volatile memory to the cache memory.

15. The data organization manager of claim 14, wherein said cache memory comprises random access memory (RAM), and said non-volatile memory comprises flash memory (FLASH).

16. The data organization manager of claim 14, wherein said battery comprises a rechargeable battery that is normally trickle charged by the power supply.

17. A data organization manager for a fault-tolerant storage subsystem having an array of failure independent data storage units for storing data from a host, the data organization manager comprising:

a controller that logically divides the data storage area on the data storage units into a hybrid of logical mirror area and a logical stripe area, wherein the controller stores data from a host in the mirror area by duplicating the data and keeping a duplicate copy of the data on a pair of storage units, and the controller stores host data in the stripe area as stripes of blocks, including data blocks and associated error-correction blocks; the controller further maintaining a data set in the stripe area for storing host data, and an associated log cache in the mirror area wherein the log cache is duplicated in the mirror area;

wherein the controller further reserves one of the storage units as a spare for use in case one of the other storage units fails, such that while the spare storage unit is not in use, the controller further:

replicates the log cache data stored in the mirror area into the spare storage unit, such that multiple copies of that data are stored in the spare storage unit; and upon receiving a request to read data from the data set, the controller determines if the requested data is in the spare storage unit, and if so, the controller selects a copy of the requested data in the spare storage unit that can be provided with minimum read latency relative to other copies of the selected data, and provides the selected copy of the requested data.

* * * * *